(12) United States Patent
Gong

(10) Patent No.: US 9,787,206 B2
(45) Date of Patent: Oct. 10, 2017

(54) SYNCHRONOUS RECTIFICATION FOR FLYBACK CONVERTER

(71) Applicant: Infineon Technologies Austria AG, Villach (AT)

(72) Inventor: Xiaowu Gong, Singapore (SG)

(73) Assignee: Infineon Technologies Austria AG, Villach (AT)

( * ) Notice: Subject to any disclaimer, the term of this patent is extended or adjusted under 35 U.S.C. 154(b) by 417 days.

(21) Appl. No.: 14/334,166

(22) Filed: Jul. 17, 2014

(65) Prior Publication Data

US 2016/0020703 A1   Jan. 21, 2016

(51) Int. Cl.
*H02M 3/335*   (2006.01)

(52) U.S. Cl.
CPC ..... *H02M 3/33592* (2013.01); *Y02B 70/1475* (2013.01)

(58) Field of Classification Search
CPC ......... H02M 3/33507; H02M 3/33523; H02M 3/335; H02M 3/33515; H02M 3/33576;
(Continued)

(56) References Cited

U.S. PATENT DOCUMENTS 5,570,276 A * 10/1996 Cuk ...................... H02M 3/005
                                                         323/266
5,991,171 A * 11/1999 Cheng ............... H02M 3/33507
                                                         363/21.03

(Continued)

FOREIGN PATENT DOCUMENTS

CN   101106333 A1   1/2008
CN   102792574 A1   11/2012
(Continued)

OTHER PUBLICATIONS

Office Action, in the German language, from counterpart German Application No. 102015111532.8, dated May 11, 2016, 6 pp.
(Continued)

*Primary Examiner* — Jue Zhang
*Assistant Examiner* — Kevin H Sprenger
(74) *Attorney, Agent, or Firm* — Shumaker & Sieffert, P.A.

(57) ABSTRACT

A flyback converter is described that includes a synchronous rectification integrated circuit (SRIC). The SRIC is configured to determine an actual turn-on time associated with a secondary switching element during an initial switching cycle and determine an error time that defines approximately a difference between the actual turn-on time and a predicted turn-on time associated with the secondary switching element. The predicted turn-on time defines approximately an amount of time to delay switching-off the secondary switching element after initially switching-on the secondary switching element, during an initial switching cycle of the secondary switching element. During a subsequent switching cycle of the secondary switching element, the SRIC is further configured to delay switching-off the secondary switching element for a period of time approximately equal to the predicted turn-on time and the error time. After delaying switching-off the secondary switching element the SRIC is configured to switch-off the secondary switching element.

19 Claims, 11 Drawing Sheets

(58) Field of Classification Search
CPC ......... H02M 3/33592; H02M 3/33561; H02M
3/33569; H02M 3/1563; H02M 3/3385;
H02M 3/156; H02M 3/1584; H02M
3/157; H02M 1/32; H02M 1/4258; H02M
1/4208; H02M 1/4225; H02M 1/4233;
H02M 2001/0032; H02M 7/066; H02M
7/06; H02M 7/493; H02M 7/53871;
H02M 7/217; H02M 7/219; H02M
5/4585; H02M 5/525; H02M 5/7575
USPC .......... 363/21.12–21.18, 76–82, 84, 89, 123,
363/125–127
See application file for complete search history.

(56) References Cited

U.S. PATENT DOCUMENTS

| | | | | |
|---|---|---|---|---|
| 5,991,172 | A * | 11/1999 | Jovanovic | H02M 1/4258 363/132 |
| 6,069,804 | A * | 5/2000 | Ingman | H02J 7/0068 363/124 |
| 6,961,253 | B1 * | 11/2005 | Cohen | H02M 1/08 363/89 |
| 7,701,733 | B2 | 4/2010 | Yang et al. | |
| 7,977,926 | B2 * | 7/2011 | Williams | H02M 3/158 323/223 |
| 8,611,109 | B2 | 12/2013 | Roessler et al. | |
| 8,749,996 | B2 | 6/2014 | Hosotani | |
| 8,873,254 | B2 * | 10/2014 | Morris | H02M 3/335 363/21.14 |
| 9,069,020 | B2 | 6/2015 | Fahlenkamp et al. | |
| 2004/0240243 | A1 | 12/2004 | Meyer et al. | |
| 2008/0037302 | A1 | 2/2008 | Yang | |
| 2009/0027926 | A1 | 1/2009 | Yang et al. | |

FOREIGN PATENT DOCUMENTS

| | | |
|---|---|---|
| CN | 103312176 A1 | 9/2013 |
| DE | 102011083884 A1 | 4/2012 |
| DE | 102013111348 A1 | 4/2014 |

OTHER PUBLICATIONS

"mWSaver Synchronous Rectification Controller for Flyback and Forward Freewheeling Rectification," Product Data Sheet FAN6204, Rev. 1.0.3, Fairchild Semiconductor Corporation, Dec. 2013, 14 pp.

"GreenChip synchronous rectifier controller," Product Data Sheet TEA1792T, Rev. 2-9, NXP Semiconductors, Jul. 2012, 13 pp.

Office Action, in the Chinese language, from counterpart Chinese Application No. 201510419749.4, dated Jul. 3, 2017, 5 pp.

* cited by examiner

SYNCHRONOUS RECTIFICATION FOR FLYBACK CONVERTER

TECHNICAL FIELD

This disclosure relates to power converters, and more particular, techniques related to synchronous rectification of flyback power converters.

BACKGROUND

To boost efficiency, some flyback converters may perform synchronous rectification (otherwise known as "active rectification") techniques and at the secondary-side of the converter, include a Synchronous Rectification (SR) integrated circuit for controlling a SR switching element. The SR integrated circuit may sense voltage level changes at the secondary-side that indicate the operating state of the primary switching element located at the primary-side of the converter. Based on the sensed voltage level changes, the SR integrated circuit may control the SR switching element, and cause the SR switching element to synchronize with the primary switching element such that the SR switching element and the primary switching element operate "in-synch" and at matching operating states.

Some drawbacks to SR integrated circuits are that they may generally be too costly and/or too complex for some flyback converters that would otherwise benefit from synchronous rectification. For example, some applications of flyback converters may need an SR integrated circuit that can withstand very high voltages and as such, has a very high breakdown voltage (e.g., >200V). Additionally, some applications may need the SR integrated circuit to detect very low negative voltage levels (e.g., approximately −10 mV). Lastly, the SR integrated circuit may need to perform accurately (e.g., relative to the primary element switching operations) independent of the requirements associated with the input and output voltage levels of the flyback converter and/or the operating frequency of the flyback converter.

SUMMARY

In general, circuits and techniques are described for enabling a flyback converter to use predictive timing techniques to perform synchronous rectification, despite the input voltage, the output voltage, and/or the switching frequency of the flyback converter. The flyback converter includes a synchronous rectification (SR) integrated circuit (IC) to cause a SR switching element to switch-on and switch-off "in-synch with" a primary switching element. The SR IC can automatically adjust its timing after subsequent switching cycles to cause the SR switching element to switch, in-synch with the primary switching element, with ever increasing accuracy.

For instance, the SR IC may cause the SR switching element to switch-on, based at least in part on, the voltage level at the secondary-side winding of the transformer of the flyback converter. Then, based at least in part on the level of current at the secondary-side winding of the flyback converter, the SR IC may determine the amount of time that the secondary-side winding will require to demagnetize. Based on the predicted demagnetization time, the SR IC can determine when a primary side controller will cause the primary switching element to switch-off. The SR IC may improve its prediction of the secondary-side demagnetization time using compensation techniques. Over time, the switch-off of the SR switching element may become more accurate, and the switch-off of the SR switching element may become increasingly more in-synch with, the switch-off of the primary switching element.

In one example, the disclosure is directed to a method that includes determining, based at least in part on a voltage at a secondary-side winding of a transformer of a flyback converter, a predicted turn-on time associated with a secondary switching element of a flyback converter, the predicted turn-on time defining approximately an amount of time to delay switching-off the secondary switching element after initially switching-on the secondary switching element, during an initial switching cycle of the secondary switching element. The method further includes determining an actual turn-on time associated with the secondary switching element during the initial switching cycle, and determining an error time, wherein the error time defines approximately a difference between the actual turn-on time and the predicted turn-on time during the initial switching cycle. The method further includes during a subsequent switching cycle of the secondary switching element, and after switching-on the secondary switching element during the subsequent switching cycle, delaying switching-off the secondary switching element for a period of time approximately equal to the predicted turn-on time and the error time during the subsequent switching cycle. The method further includes after delaying switching-off the secondary switching element during the subsequent switching cycle, switching-off the secondary switching element during the subsequent switching cycle.

In another example, the disclosure is directed to a power circuit that includes a transformer arranged to store energy between a primary-side of the power circuit and a secondary-side of the power circuit, a primary switching element coupled to a primary-side winding of the transformer, a secondary switching element coupled to a secondary-side winding of the transformer, and a synchronous rectification integrated circuit. The synchronous rectification integrated circuit is configured to determine an actual turn-on time associated with the secondary switching element during an initial switching cycle, and determine an error time that defines approximately a difference between the actual turn-on time and a predicted turn-on time associated with the secondary switching element during the initial switching cycle, wherein the predicted turn-on time defines approximately an amount of time to delay switching-off the secondary switching element after initially switching-on the secondary switching element, during an initial switching cycle of the secondary switching element. The synchronous rectification integrated circuit is further configured to during a subsequent switching cycle of the secondary switching element, and after switching-on the secondary switching element during the subsequent switching cycle, delay switching-off the secondary switching element for a period of time approximately equal to the predicted turn-on time and the error time during the subsequent switching cycle. The synchronous rectification integrated circuit is further configured to after delaying switching-off the secondary switching element during the subsequent switching cycle, switch-off the secondary switching element during the subsequent switching cycle.

In another example, the disclosure is directed to a power circuit comprising means for determining, based at least in part on a voltage at a secondary-side winding of a transformer of a flyback converter, a predicted turn-on time associated with a secondary switching element of a flyback converter, the predicted turn-on time being an amount of time to delay switching-off the secondary switching element after initially switching-on the secondary switching element, during an initial switching cycle of the secondary switching element. The power circuit further includes means for determining an actual turn-on time associated with the secondary switching element during the initial switching cycle, means for determining an error time between the actual turn-on time and the predicted turn-on time during the initial switching cycle, and means for during a subsequent switching cycle of the secondary switching element, and after switching-on the secondary switching element during the subsequent switching cycle, delaying switching-off the secondary switching element for a period of time equal to the predicted turn-on time and the error time during the subsequent switching cycle. The power circuit further comprises means for after delaying switching-off the secondary switching element during the subsequent switching cycle, switching-off the secondary switching element during the subsequent switching cycle.

The details of one or more examples are set forth in the accompanying drawings and the description below. Other features, objects, and advantages of the disclosure will be apparent from the description and drawings, and from the claims.

DETAILED DESCRIPTION

Figure 1:
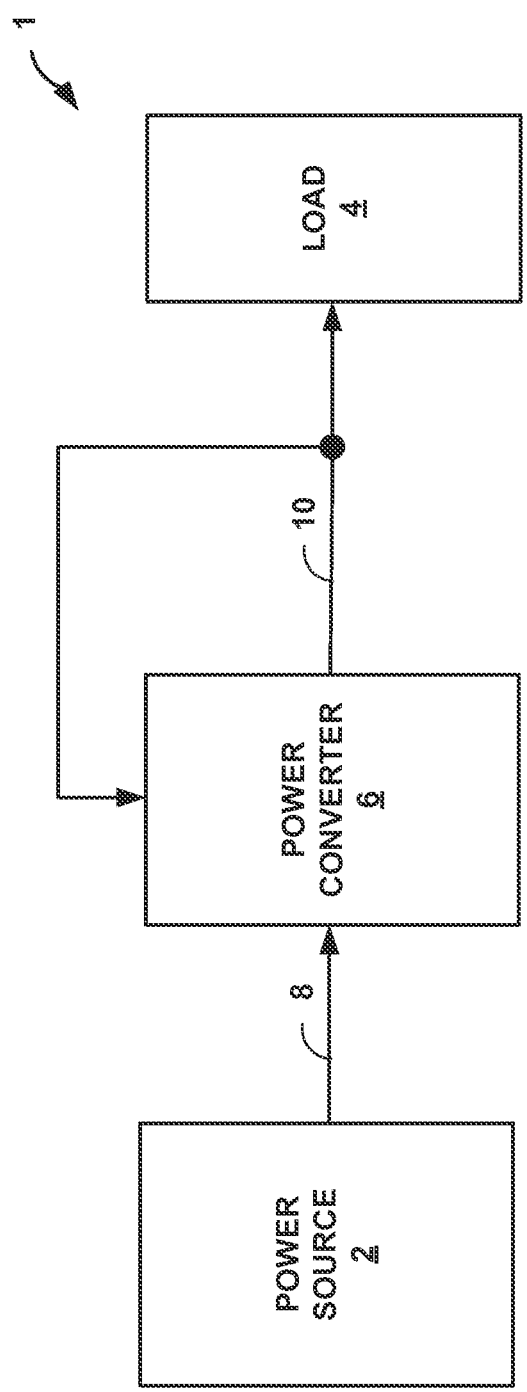
FIG. 1 is a block diagram illustrating an example system for converting power from a power source, in accordance with one more aspects of the present disclosure.

FIG. 1 is a block diagram illustrating system 1 for converting power from power source 2, in accordance with one or more aspects of the present disclosure. FIG. 1 shows system 1 as having three separate and distinct components shown as power source 2, power converter 6, and load 4, however system 1 may include additional or fewer components. Power source 2, power converter 6, and load 4 may be three individual components or may represent a combination of one or more components that provide the functionality of system 1 as described herein.

System 1 includes power source 2 which provides electrical power to system 1. Numerous examples of power source 2 exist and may include, but are not limited to, power grids, generators, transformers, batteries, solar panels, windmills, regenerative braking systems, hydro-electrical or wind-powered generators, or any other form of devices that are capable of providing electrical power to system 1.

System 1 includes power converter 6 which operates as a flyback. Power converter 6 may include one or more transformers to convert the power input at the primary-side of the one or more transformers into a power output to load 4 coupled to a secondary-side of the one or more transformers.

System 1 further includes load 4. Load 4 receives the electrical power (e.g., voltage and current) converted by power converter 6. In some examples, the power converted by power converter 6 passes through a filter (not shown) before reaching load 4. In some examples, the filter is a sub-component of power converter 6, an external component of power converter 6, and/or a sub-component of load 4. In any event, load 4 (also sometimes referred to herein as device 4) may use the filtered or unfiltered electrical power from power converter 6 to perform a function.

Numerous examples of load 4 exist and may include, but are not limited to, computing devices and related components, such as microprocessors, electrical components, circuits, laptop computers, desktop computers, tablet computers, mobile phones, batteries, speakers, lighting units, automotive/marine/aerospace/train related components, motors, transformers, or any other type of electrical device and/or circuitry that receives a voltage or a current from a power converter.

Power source 2 may provide electrical power with a first voltage and current level over link 8. Load 4 may receive electrical power that has a second voltage and current level, converted by power converter 6, over link 10. Links 8 and 10 represent any medium capable of conducting electrical power from one location to another. Examples of links 8 and 10 include, but are not limited to, physical and/or wireless electrical transmission mediums such as electrical wires, electrical traces, conductive gas tubes, twisted wire pairs, and the like. Each of links 8 and 10 provide electrical coupling between, respectively, power source 2 and power converter 6, and power converter 6 and load 4. In addition, link 10 provides a feedback loop or circuit for carrying information to power converter 6 associated with the characteristics of the power output received by load 4.

In the example of system 1, electrical power delivered by power source 2 can be converted by converter 6 to power that has a regulated voltage and/or current level that meets the power requirements of load 4. For instance, power source 2 may output, and power converter 6 may receive, power which has a first voltage level at link 8. Power converter 6 may convert the power which has the first voltage level to power which has a second voltage level that is required by load 4. Power converter 6 may output the power that has the second voltage level at link 10.

Load 4 may receive the power that has the second voltage level at link 10. Load 4 may use the power having the second voltage level to perform a function (e.g., power a microprocessor, charge a battery, etc.). Power converter 6 may receive information over ink 10 associated with the power that has the second voltage level. For instance, feedback control (e.g., current sensing) circuitry of power converter 6 may detect the voltage or current level of the power output at link 10 and a control unit of converter 6 may adjust the power output at link 10 based on the detected voltage or current level to cause the filtered power output to have a different voltage or current level that fits within a voltage or current level tolerance window required by load 4.

Figure 2:
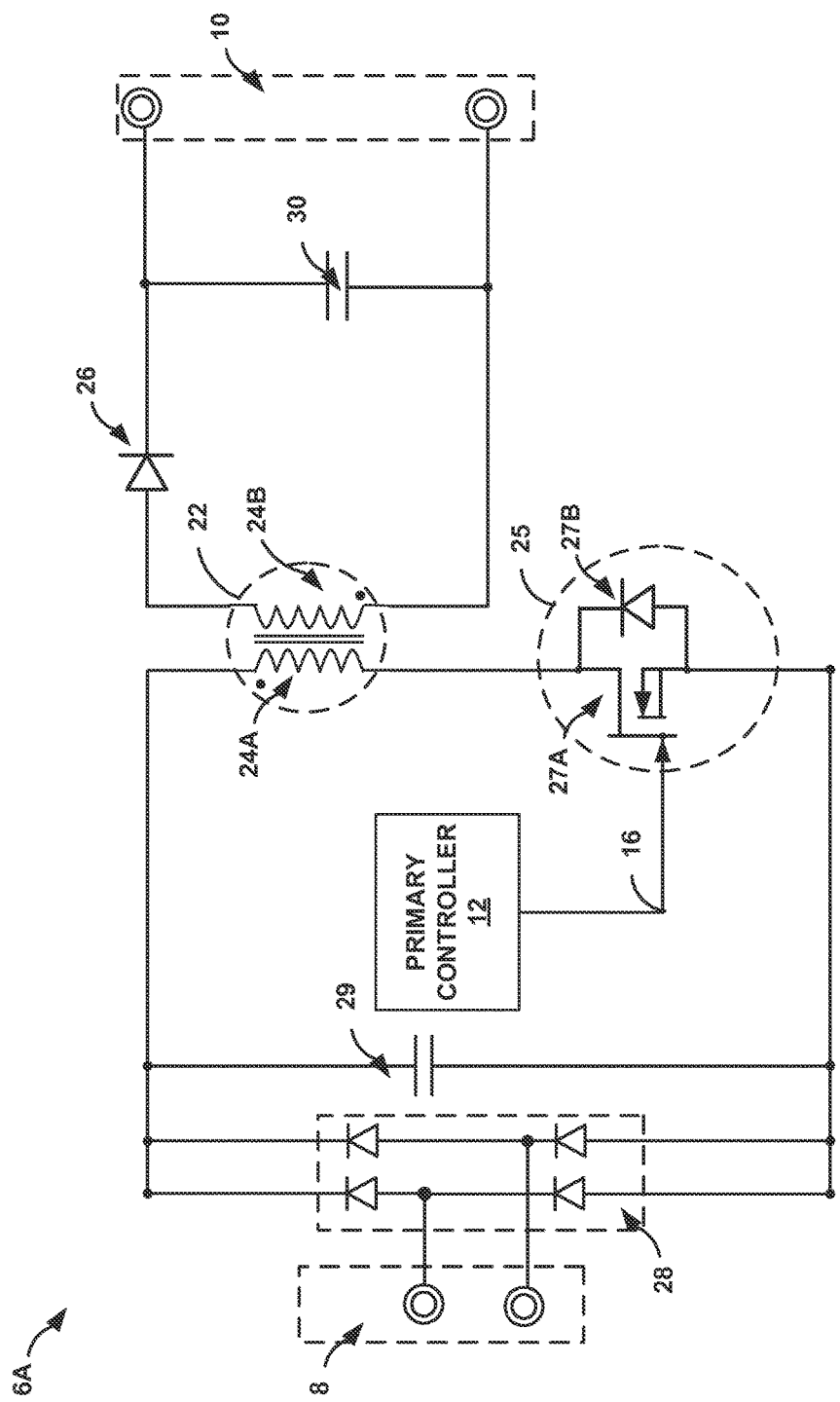
FIG. 2 is a circuit diagram illustrating an example power converter, of the example system shown in FIG. 1, which is not configured to perform synchronous rectification.

FIG. 2 is a circuit diagram illustrating power converter 6A as one example of power converter 6 from system 1 of FIG. 1, which is not configured to perform synchronous rectification. Power converter 6A includes transformer 22. Transformer 22 provides isolation between a primary-side of power converter 6A and a secondary-side of power converter 6A. Primary controller 12 is shown as an optional component that may or may not be included as part of converter 6A.

The primary-side of power converter 6A includes rectifier 28, input capacitor 29, primary switching element 25 arranged in series between rectifier 28 and primary winding 24A. In the example of FIG. 2, primary switching element is a power MOSFET and includes MOSFET 27A and body diode 27B.

The secondary-side of power converter 6A includes secondary element 26 arranged in series between secondary winding 24B and, via link 10, load 4. In the example of FIG. 2, secondary element 26 is a diode. The secondary-side also includes output capacitor 30 in parallel to load 4.

In operation, primary controlled 2 may provide a gate control signal via link 16 to primary switching element 25 that causes MOSFET 27A to open or close. Primary controller 12 may generate agate signal across link 16 that causes MOSFET 27A to operate in the on-state and as a result, causes a current to travel from source 2, via link 8, through primary winding 24A. Primary controller 12 may generate a different gate signal that causes MOSFET 27A to operate in the off-state and, as a result, inhibits current from traveling from source 2, via link 8, through primary winding 24A. Primary controller 12 may modulate the gate control signal to MOSFET 27A of primary switching element 25. In this way, controller 12 may cause converter 6A to vary the output voltage $V_{OUT}$ that converter 6A outputs across link 10.

During a switching cycle, when secondary element 26 becomes reverse-biased, the load current ($I_{OUT}$) is supplied from output capacitor 30. Output capacitor 30 typically has a capacitance that is large enough to supply the required amount of load current $I_{OUT}$ for the time period $T_{ON}$, while also satisfying the maximum specified droop in the output voltage $V_{OUT}$.

Figure 3:
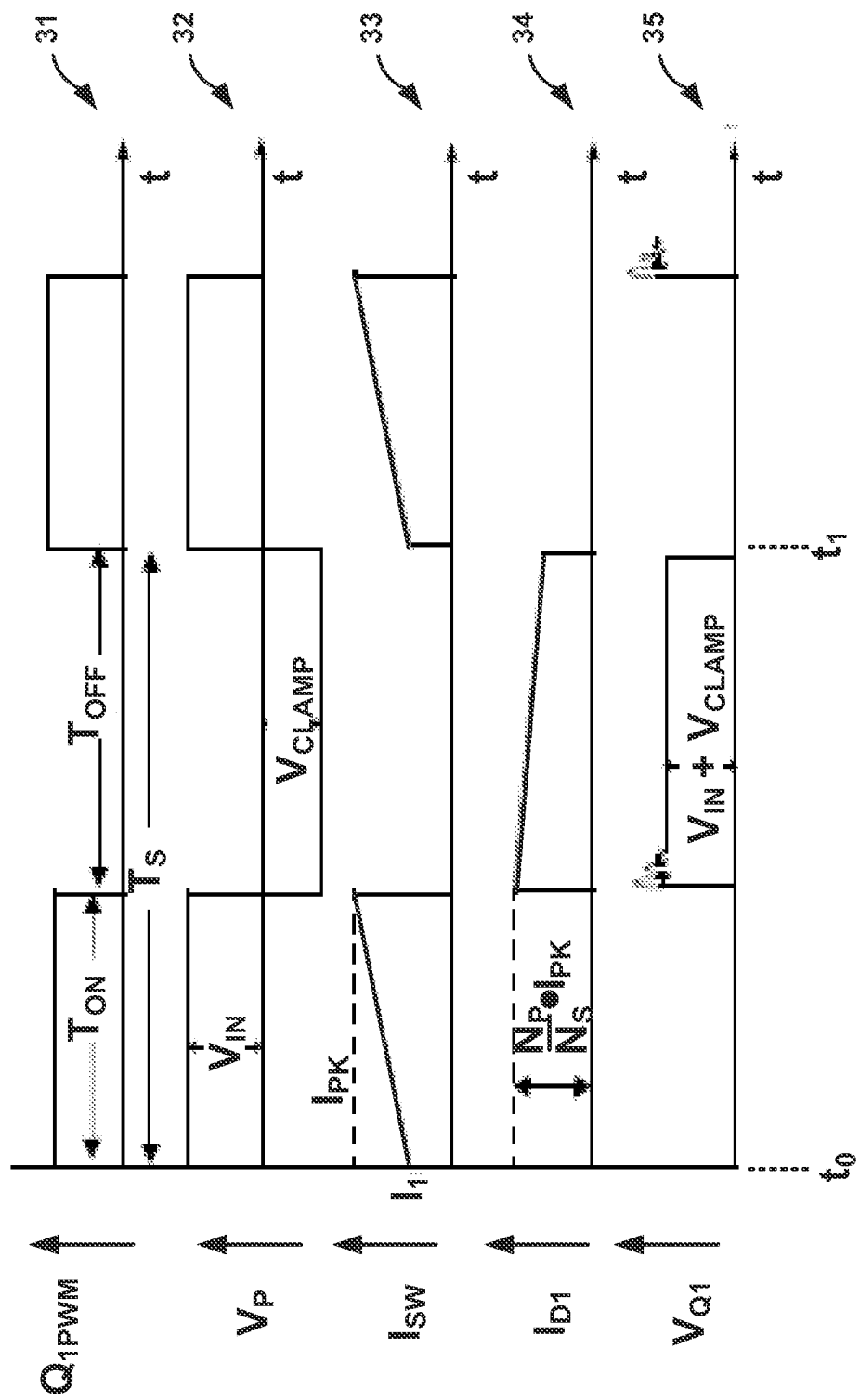
FIG. 3 is a timing diagram illustrating various voltage characteristics of the example power converter shown in FIG. 2.

FIG. 3 is a timing diagram illustrating various voltage characteristics of power converter 6A shown in FIG. 2. FIG. 3 shows plots 31-35 during a switching cycle $T_S$ of converter 6A, between times t0 and t1.

Plot 31 shows the gate pulse $Q_{1PWM}$ for MOSFET 27A during the switching cycle $T_S$. During period $T_{ON}$ of the switching cycle $T_S$, the gate pulse $Q_{1PWM}$ is high, and during the period $T_{OFF}$, the gate pulse $Q_{1PWM}$ is low.

Plot 32 shows the voltage $V_P$ across primary winding 24A of transformer 22 during the switching cycle $T_S$. During period $T_{ON}$ of the switching cycle $T_S$, the voltage $V_P$ is equal to $V_{IN}$ from source 2, via link 8, and during the period $T_{OFF}$, the voltage $V_P$ is equal to the clamping voltage $V_{CLAMP}$ associated with the body diode 27B.

Plot 33 shows the current $I_{SW}$ through MOSFET 27A during the switching cycle $T_S$. During period $T_{ON}$ of the switching cycle $T_S$, the current $I_{SW}$ increases linearly from an initial current level $I_1$ to a peak, or maximum current $I_{PK}$. During the period $T_{OFF}$, the current $I_{SW}$ is equal to zero amps.

Plot 34 shows the current $I_{D1}$ through secondary element 26 during the switching cycle $T_S$. During period $T_{ON}$ of the switching cycle $T_S$, the current is equal to zero amps. During the period $T_{OFF}$, the current $I_{D1}$ decreases linearly (at a rate that is dependent on the winding ratio of transformer 22 ($N_P/N_S$) (e.g., where the number of windings of primary side winding 24A is $N_P$ and the number of windings of secondary side winding 24B is $N_S$) and the maximum output current ($I_{PK}$) multiplied by the winding ratio.

Plot 35 shows the voltage $V_{Q1}$ across MOSFET 27A during the switching cycle $T_S$. During period $T_{ON}$ of the switching cycle $T_S$, the voltage $V_{Q1}$ is approximately zero volts. During period $T_{OFF}$, the voltage $V_{Q1}$ settles at a voltage that is equal to the input voltage $V_{IN}$ plus the clamping voltage $V_{CLAMP}$ where $V_{CLAMP}$ is the secondary side output voltage $V_{OUT}$ multiplied by the turn ratio of transformer 22 ($N_P/N_S$).

As shown in FIG. 3, when secondary element 26 is a diode, secondary element 26 is a "power loss" device. The power associated with secondary element 26 can be represented by the following equation (EQ. 1).

$$P_{SECONDARY}(V_{FR}+V_{OUTPUT})*I_{OUTPUT} \qquad \text{EQ. 1}$$

The power loss at secondary element 26 is $V_{FR}$ multiplied by $I_{OUTPUT}$, where $V_{FR}$ is the forward voltage of secondary element 26. As $V_{FR}$ increases and/or $V_{OUTPUT}$ decreases, the efficiency of converter 6A decreases. In order to increase efficiency, some flyback converters perform synchronous rectification (SR) techniques by replacing the secondary-side diode (e.g., secondary element 26) with a SR power MOSFET that switches-on and switches-off synchronously with the primary switching element.

Figure 4:
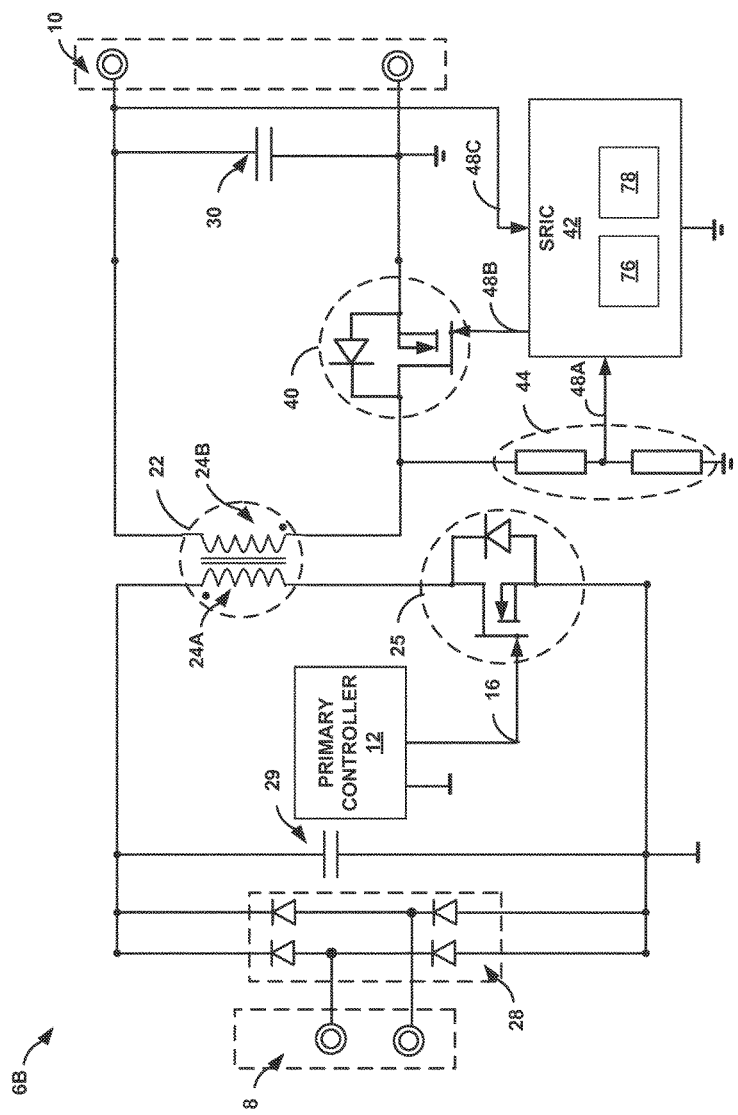
FIG. 4 is a circuit diagram illustrating an example power converter of the example system shown in FIG. 1, which is configured to perform synchronous rectification, in accordance with one or more aspects of the present disclosure.

FIG. 4 is a circuit diagram illustrating power converter 6B of as an example of power converter 6 from system 1 of FIG. 1, which is configured to perform synchronous rectification, in accordance with one or more aspects of the present disclosure. Power converter 6A is described in the context of system 1 of FIG. 1.

Power converter 6B includes transformer 22 for providing isolation between a primary-side of power converter 6B and a secondary-side of power converter 6B. The primary-side of power converter 6B includes rectifier 28, input capacitor 29, primary switching element 25, and primary controller 12. Primary switching element 25 is arranged in series between rectifier 28 and primary winding 24A of transformer 22. Primary controller 12 resides at the primary-side of converter 6B, primarily to control the modulation of primary switching element 25.

The secondary-side of power converter 6B includes output capacitor 30 in parallel to load 4 and secondary switching element 40 (e.g., a power MOSFET) arranged in series between secondary winding 24B and output capacitor 30 load 4. The secondary-side of converter 6B also voltage divider 44 and includes synchronous rectification (SR) integrated circuit (IC) 42 (referred to simply as "SRIC 42").

SRIC 42 is configured to control secondary switching element 40 to perform synchronous rectification on behalf of converter 6B. By using SRIC 42, power converter 6B can perform predictive timing techniques while performing synchronous rectification, despite the input voltage at link 8, the output voltage at link 10, and/or the switching frequency of primary switching element 25.

SRIC 42 may send gate control signals via link 48B to cause secondary switching element 40 to switch-on or switch-off depending on the voltages detected by SRIC 42 at links 48A and 48C. SRIC 42 may perform synchronous rectification techniques without the need to withstand very high voltages (e.g., >200V) or the requirement to detect very low negative voltages (e.g., approximately −10 mV). In addition, the accuracy of SRIC 42 (e.g., how closely SRIC 42 can cause secondary switching element 40 to switch-on and switch-off in-synch with the switch-on and switch-off of primary element 25) may be very high since, unlike some other types of synchronous rectification integrated circuits, the accuracy of SRIC 42 may not depend on the input voltage, the output voltage, and/or the working frequency.

SRIC 42 includes prediction unit 76 and compensation unit 78. Prediction unit 76 may control when secondary switching element 40 switches-on and switches-off during synchronous rectification. Compensation unit 78 may adjust the timing of the synchronous rectification of prediction unit 76 with each switching cycle so that the accuracy of the switch-on and switch-off of secondary switching element 40 improves over time.

Prediction unit 76 of SRIC 42 causes secondary switching element 40 to switch-on and switch-off "in-synch" with the switch-on and switch-off of primary switching element 25 (e.g., while primary controller 12 modulates primary switching element 25 to produce a voltage output at link 10). While prediction unit 76 of SRIC 42 causes secondary switching element 40 to switch-on based, at least in part, on the voltage level at secondary-side winding 24B of transformer 22, diction unit 76 of SRIC 42 causes secondary switching element 40 to switch-off, based at least in part on, the level of current at secondary winding 24B. From the current at secondary winding 24B, prediction unit 76 of SRIC 42 determines the amount of time that secondary-side winding 24B will take to demagnetize and based on the predicted demagnetization time, determines when primary element 25 will likely switch-off.

Compensation unit 78 of SRIC 42 may improve the prediction of the demagnetization time computed by prediction unit 76. Over time, compensation unit 78 may cause the switch-off of secondary switching element 40 to occur increasingly more in-synch, with the switch-off of primary switching element 25. For example, compensation unit 78 may compare the predicted demagnetization time with the actual demagnetization time of a previous switching cycle to cause prediction unit 76 to update its predicted demagnetization time of a subsequent switching cycle.

In operation, SRIC 42 may generate a gate control signal across link 48B to cause secondary switching element 40 to switch-on or switch-off. Prediction unit 76 of SRIC 42 may cause SRIC 42 to generate the gate control signal at link 48B based on predictive timing control techniques that rely on the voltage or current levels detected at the secondary-side of converter 6B via links 48A and 48C.

Prediction unit 76 of SRIC 42 may monitor the voltage across secondary-side winding 24B and based on the voltage, predict when primary switching element 25 has switched-on. From information obtained via link 48A from voltage divider 44, prediction unit 76 may determine whether the voltage across secondary winding 24B is less than a low-voltage threshold ($V_{LTH}$). Prediction unit 76 may infer that primary controller 12 has caused primary switching element 25 to switch-on, if the voltage level at secondary-side winding 24B satisfies the low-voltage threshold (e.g., less than or equal to zero volts). Responsive determining that the voltage satisfies the low-voltage threshold, and that primary switching element 25 has switched on, prediction unit 76 may cause SRIC 24 to generate a gate signal across link 48A that simultaneously causes secondary switching element 40 to switch-on with the switch-on of primary element 25. In this way, SRIC 24 and primary controller 12 cause primary element 25 and secondary switching element 40 to synchronously switch-on.

To determine when to switch-off secondary switching element 40, SRIC 42 relies on predictive timing control techniques performed by prediction unit 76, and enhanced by compensation unit 78. In doing so, units 76 and 78 of SRIC 42 enable converter 6B to switch-off a synchronous rectification switching element, such as secondary switching element 40, with far less complexity, accuracy, and cost than other power converters. Rather than rely on overly complex and expensive components for analyzing secondary side voltage levels and making comparisons to very low voltage thresholds to determine when to switch-off a synchronous rectification switching element, unit 76 simply predicts an amount of time to delay ($T_{DET}$) (also referred to as the "turn-on time") before automatically causing secondary switching element 40 to switch-off.

SRIC 42 may switch-off secondary switching element 40, independent of the detected voltage level at secondary winding 24B. Unit 76 SRIC 42 may base its prediction of $T_{DET}$ (e.g., the turn-on time of secondary switching element 40) on the derivations shown in following EQS. 2-8. Compensation unit 78 may improve the accuracy of the control of secondary switching element 40 by causing prediction unit 76 to compensate for errors between the actual turn-on time realized by secondary switching element 40 during a previous switching cycle and the predicted turn-on time. In other words, compensation unit 78 may cause adjustments to the way in which prediction unit 76 controls element 40 so that element 40 has a turn-on time that better approximates the predicted turn-on time $T_{DET}$. For instance, element 40 may have actual turn-on time that is within a tolerance (e.g., +/− one to ten micro seconds, one to ten milliseconds, etc.) of the predicted turn-on time $T_{DET}$.

EQ. 2 shows that in discontinuous mode operation (DCM), when primary switching element 25 is switched-off for the amount of time $T_{OFF}$, the maximum or "peak" level of current of secondary-side winding 24B ($I_{SP}$) is achieved. In EQ. 2, ($I_{PP}$) is the peak current of primary-side winding 24A, ($N_P$) represents the number of turns associated with primary-side winding 24A, and ($N_S$) is the number of turns at secondary-side winding 24B.

$$I_{SP} = \frac{N_P}{N_S} \times I_{PP} \qquad \text{EQ. 2}$$

When primary switching element 25 is switched-on for the amount of time ($T_{ON}$), the maximum or "peak" level of current of primary-side winding 24A ($I_{PP}$), given by EQ. 3, is achieved. In EQ. 3, ($L_P$) is the inductance of primary-side winding 24A and ($V_{IN}$) is the primary-side input voltage from source 2.

$$I_{PP} = \frac{V_{in}}{L_P} \times T_{on} \qquad \text{EQ. 3}$$

EQ. 4 also shows that the peak level of current of secondary-side winding 24B ($I_{SP}$) is proportionate to a ratio between the output voltage ($V_{OUT}$) across output capacitor 30 and at load 4, the amount of time that secondary-side winding 24B takes to demagnetize ($T_{DET}$), and the inductance of primary-side winding 24A (LS).

$$I_{SP} = \frac{V_{out}}{L_S} \times T_{DET} \qquad \text{EQ. 4}$$

Accordingly, by substituting the terms of EQ. 2 with respective, equivalent terms of EQ. 3 and EQ. 4 (as shown by EQS, 5, 6, and 7) the on-time of secondary switching element 40 ($T_{DET}$) can be computed per EQ. 8.

$$\frac{V_{out}}{L_S} \times T_{DET} = \frac{N_P}{N_S} \times \frac{V_{in}}{L_P} \times T_{on} \qquad \text{EQ. 5}$$

$$\frac{N_P}{N_S} = \sqrt{\frac{L_P}{L_S}} = n \qquad \text{EQ. 6}$$

$$\frac{V_{in} \times T_{on}}{n} = V_{out} \times T_{DET} \qquad \text{EQ. 7}$$

$$T_{DET} = \frac{V_{IN} \times T_{on}}{n \times V_{OUT}} \qquad \text{EQ. 8}$$

EQS. 5-7 are derived based on the assumption that the average voltage of transformer 22 during steady-state is equal to zero volts during a complete switching period, $T_{ON}+T_{OFF}$. The product of charge voltage ($V_{IN}/n$) and charge time ($T_{ON}$) is equal to the product of discharge voltage ($V_{OUT}$) and discharge time ($T_{DET}$).

In the example of FIG. 4, SRIC 42 can sense the voltage level at secondary-side winding 24B via links 48A and/or 48C. When primary switching element 25 is switched-on (e.g., during the $T_{ON}$), prediction unit 76 of SRIC 42 may determine whether to cause secondary switching element 40 to switch-on or switch-off based on the voltage sensed at link 48A. For example, if the voltage at link 48 drops at or below a low-voltage threshold (e.g., when the body diode of secondary switching element 40 starts conducting and the voltage at secondary-side winding 24B drops to zero) SRIC 42 may cause secondary switching element 40 to switch-on.

Prediction unit 76 may cause secondary switching element 40 to automatically switch-off, after predicted time $T_{DET}$. For example, after causing secondary switching element 40 to switch-on, prediction unit 76 determine when $T_{DET}$ has elapsed using an algorithm based on EQS. 2-8 shown above. If prediction unit 76 determines that $T_{DET}$ has elapsed, prediction unit 76 may alter the gate drive signal across link 48B to cause secondary switching element 40 to switch-off. In this manner, prediction unit 76 of SRIC 42 may provide converter 6B with an inexpensive way to determine, with very high accuracy, when to switch-off secondary switching element 40 as part of a synchronous rectification control scheme, without having to use pins or components that can withstand very high voltages, and without having to detect very low negative voltage levels.

Compensation unit 78 of SRIC 42 may perform "compensation" or "error correction" techniques to improve the accuracy of the switching of secondary switching element 40. Compensation unit 78 may cause prediction unit 76 to reduce or increase the actual "turn-on time" associated with secondary element 40 so that the actual turn-on time more closely approximates the predicted turn-on time $T_{DET}$ from EQ. 2-8.

For example, during an initial switching cycle, prediction unit 76 causes switching element 40 to switch-off after time $T_{DET}$. Compensation unit 78 may measure the actual duration of the turn-on time associated with secondary switching element 40 during that initial switching cycle. Compensation unit 78 may identify a difference between the duration of the actual turn-on time and the predicted $T_{DET}$. During a subsequent switching cycle, compensation unit 78 may cause prediction unit 76 to compensate for the identified difference between the actual turn-on time of the previous switching cycle and the predicted turn-on time $T_{DET}$ by causing prediction unit 76 to prolong or shorten the turn-on time of secondary switching element 40, depending on the difference identified by compensation unit 78.

Figure 5:
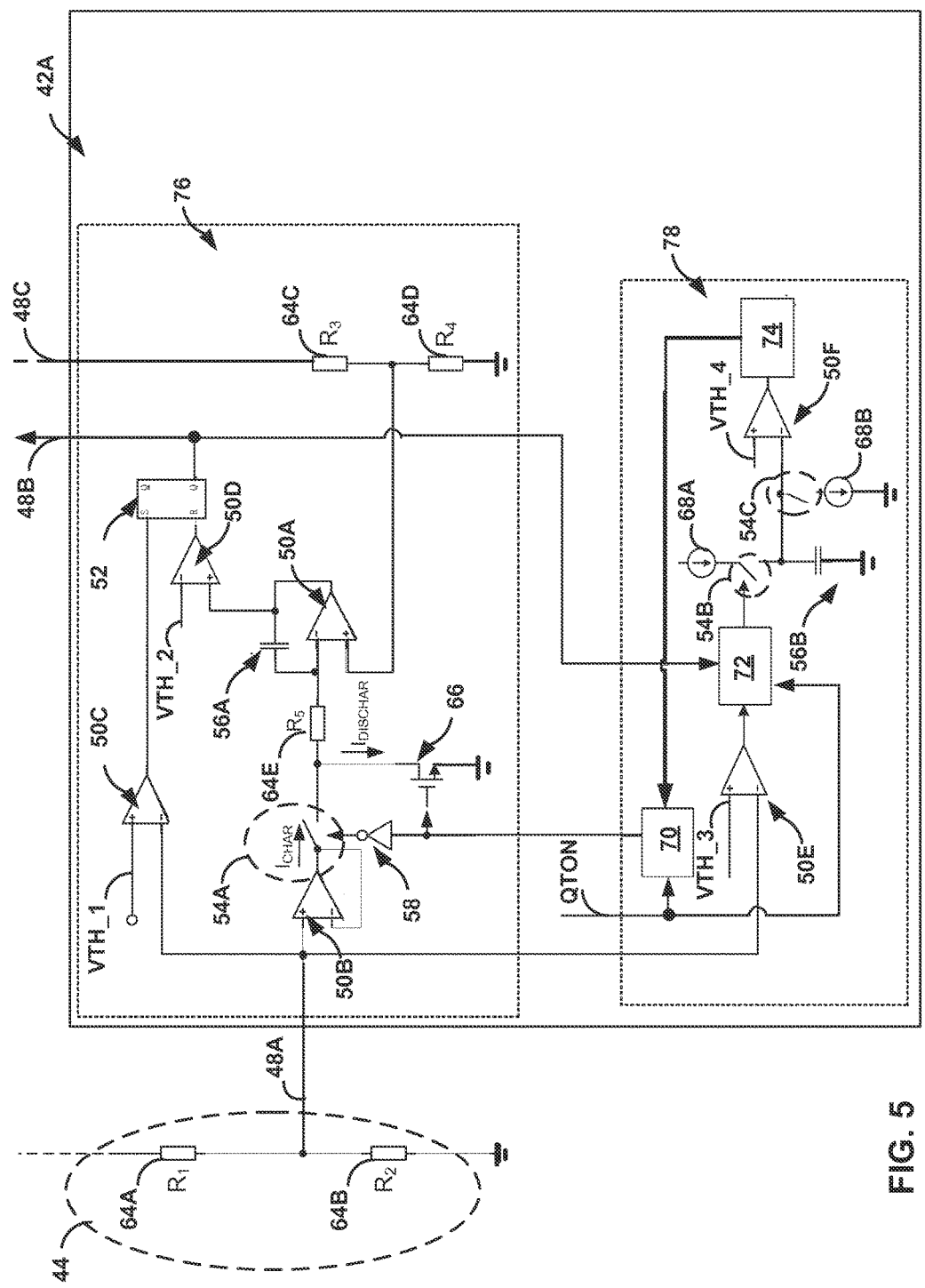
FIG. 5 is a circuit diagram illustrating an example synchronous rectification integrated circuit of the example power converter shown in FIG. 4.

FIG. 5 is a circuit diagram illustrating synchronous rectification integrated circuit (SRIC) 42A as one example of SRIC 42 of power converter 6B shown in FIG. 4. FIG. 5 is described below within the context of converter 6B and SRIC 42 of FIG. 4.

SRIC 42A includes prediction unit 76 and compensation unit 78. Distributed amongst units 76 and 78, SRIC 42A includes operational amplifiers 50A and 50B, comparators 50C-50F, latch 52, switches 54A-54C, capacitors 56A and 56B, inverter 58, internal resistors 64C-64E, transistor 66, current source 68A and current sink 68B, and logic units 70, 72, and 74. SRIC 42A is coupled to links 48A-48C.

SRIC 42A is coupled to external voltage divider 44 at link 48A. Voltage divider 44 includes external resistors 64A-64B. Resistor 64A has a resistance of R1 and resistor 64B has a resistance of R2.

Internal resistors 64C and 64D form an internal resistor divider of SRIC 42A. Internal resistors 64C and 64D divide the voltage at link 48C (e.g., the output voltage $V_{OUT}$ of converter 6B). Resistor 64C has a resistance of R3 and resistor 64D has a resistance of R4.

Resistor 64E has a resistance of R5. Resistor 64E forms half of an integrator component of prediction unit 76. The other half of the integrator of prediction unit 76 is made up of capacitor 56A.

In the example of FIG. 5, comparators 50C-50F each have a respective input tied to a threshold used by SRIC 42A in performing predictive timing and compensation techniques. For example, one input of comparator 50C may be tied to a threshold voltage (e.g., value "VTH_1") that is approximately equal to, or at least proportionate to, a typical voltage level initially at secondary-side winding 24B after primary element 25 transitions from operating in a switched-off state to operating in a switched-on state. One input of comparator 50D may be tied to a threshold voltage (e.g., value "VTH_2") that is approximately equal to, or at least proportionate to, a maximum voltage level across at capacitor 56A when primary switching element 25 is switched-off. One input of comparator 50E may be tied to a threshold voltage (e.g., value "VTH_3") that is approximately equal to, or at least proportionate to, atypical voltage level initially at secondary-side winding 24B after primary element 25 transitions from operating in a switched-on state to operating in a switched-off state. One input of comparator 50F may be tied to a threshold voltage (e.g., value "VTH_4") that is approximately equal to, or at least proportionate to, a maximum voltage level across at capacitor 56B when primary switching element 25 is switched-off.

One input signal to logic unit 70 is QTON. QTON represents a binary value that indicates the magnitude of the current at secondary-side winding 24B. For example, during $T_{ON}$, when primary switching element 25 is switched-on, the current at secondary-side winding 24B is at a minimum value (e.g., zero amps) and QTON may be at a logic level low (e.g., zero). When primary switching element 25 is switched-off, the secondary-side current may increase from the minimum value to a maximum value and QTON may be at a logic level high (e.g., one).

Prediction unit 76 may perform predictive timing based synchronous rectification techniques on behalf of SRIC 42A. That is, prediction unit 76 may predict when to cause secondary switching element 40 to switch-on and switch-off, based on an analysis of voltage and current levels detected at the secondary-side of converter 6B, such that secondary element 40 and primary element 25 operate in synch.

Compensation unit 78 may work in conjunction with prediction unit 76 to improve the accuracy of the predictive timing based synchronous rectification techniques. Compensation unit 78 may analyze the timing of secondary switching element 40 as it compares to the expected timing and adjust when prediction unit 76 causes secondary switching element 40 to switch-off such that the switch-off actually occurs as close to the predicted switch-off time ($T_{DET}$) as possible.

For example, prediction unit 76 may compare the detected voltage level at secondary winding 24B obtained via link 48A to the voltage threshold VTH_1 to determine when to cause secondary switching element 40 to switch-on. For example, if the voltage level at secondary winding 24B drops at or below the typical voltage level at secondary-side winding 24B when primary element 25 transitions from operating in a switched-off state to operating in a switched-on state (e.g., less than zero volts), comparator 50C and latch 52 may cause a gate signal to appear across link 48B that causes secondary switching element 40 to switch-on.

Latch 52 will cause the gate signal across link 48B to remain constant until the output from comparator 50D causes latch 52 to reset. In other words, until the voltage at capacitor 56A reaches the maximum voltage associated with capacitor 56A, secondary switching element 40 will remain switched-on. When the voltage at capacitor 56A goes from a minimum (e.g., zero voltage) to the maximum voltage associated with capacitor 56A, the output from comparator 50D will cause latch 52 to reset and causing secondary switching element 40 to switch-off.

To cause latch 52 to reset, and secondary switching element 40 to switch-off at the appropriate time (e.g., at a time when SRIC 42A predicts $T_{ON}$ is over and primary switching element 25 has or is about to switch back on), SRIC 42A reties in part on the capacitance of capacitor 56A and the resistance R5 of resistor 64E, to act as an integrator. Capacitor 56A is configured to discharge and charge, at just the right time and in such a way, as to cause the output from comparator 50D to change and cause latch 52 to reset after an amount of time $T_{DET}$ since secondary switching element 40 last switched-on and at the time when $T_{ON}$ is predicted to expire.

For example, during $T_{ON}$ (e.g., when primary switching element 25 is switched-on) the voltage level at secondary-side winding 24B is equal to $V_{IN}/n+V_{OUT}$. Additionally, during $T_{ON}$, current does not flows through secondary-side 24B thus QTON is at a logic level "low". When QTON is at a logic level low, logic unit 70 causes, switch 54A to close, and further causes transistor 66 to shut-off. As a result, capacitor 56A charges due to the current being output from comparator 50B such that the voltage across capacitor 56A decreases from a maximum voltage $V_A$ to a minimum voltage $V_B$, as shown below in EQ. 9.

$$V_B = V_A - \frac{\left[\left(\frac{R_2}{R_1+R_2}\right) \times \left(\frac{V_{IN}}{n}+V_{OUT}\right)\right] - \left[\left(\frac{R_4}{R_3+R_4}\right) \times V_{OUT}\right]}{R_5} \times T_{ON} \quad \text{EQ. 9}$$

After $T_{ON}$ and during $T_{OFF}$, when primary element 25 shuts off, the secondary-side current increases from a minimum (e.g., zero value to a maximum current and QTON changes to a logic level "high." The period of time when QTON is at a logic level "high" during $T_{OFF}$ is referred to as "the demagnetization time" ($T_{DET}$) and the voltage across capacitor 56A increases from a minimum voltage $V_B$ to a maximum voltage $V_C$, as shown below EQ 10.

$$V_C = V_B + \frac{\left(\frac{R_4}{R_3+R_4}\right) \times V_{OUT}}{R_5} \times T_{DET} \quad \text{EQ. 10}$$

If during $T_{DET}$, the voltage across capacitor 56A reverts back to $V_A$ (e.g., $V_C = V_A$) the delta change in voltage during $T_{ON}$ and delta change in voltage during $T_{DET}$ is the same and EQ. 11 is true.

$$\frac{\left[\left(\frac{R_2}{R_1+R_2}\right) \times \left(\frac{V_{IN}}{n}+V_{OUT}\right)\right] - \left[\left(\frac{R_4}{R_3+R_4}\right) \times V_{OUT}\right]}{R_5} \times T_{ON} = \frac{\left(\frac{R_4}{R_3+R_4}\right) \times V_{OUT}}{R_5} \times T_{DET} \quad \text{EQ. 11}$$

Accordingly, if resistors 64A, 64B, having resistances R1 and R2, respectively, are used with resistors 64C and 64D having resistances R1 and R2, respectively (as shown in EQ. 12):

$$\frac{R_2}{R_1+R_2} = \frac{R_4}{R_3+R_4} \quad \text{EQ. 12}$$

then prediction unit 76 will cause SRIC 42A to delay the switch-off of secondary switching element 40 until time $T_{DET}$ (according to EQ. 7) after causing switching element 40 to switch-on.

Compensation unit 78 may work in conjunction with prediction unit 76 to improve the accuracy of the predictive timing based synchronous rectification techniques. Compensation unit 78 may analyze the timing of secondary switching element 40 as it compares to the expected timing and adjust when prediction unit 76 causes secondary switching element 40 to switch-off such that the switch-off actually occurs as close to the predicted switch-off time ($T_{DET}$) as possible. In other words, rather than let the logic level of the binary signal QTON be tied directly to the level of current at secondary-side winding 24B, compensation unit 78 may more precisely control when the logic level of QTON changes from one logic level to the other. In this manner, compensation unit 78 may speed-up or stow-down the switch-off of secondary switching element 40 to cause the actual switch-off of secondary switching element 40 occur more closely with the actual switch-off of primary switching element 25 and therefore increase the accuracy of SRIC 42A.

For example, comparator 50E is used by compensation unit 78 to determine the actual turn-on time $T_{MEASURED}$ of secondary switching element 40 by monitoring the drain-source voltage of the transistor associated with secondary switching element 40. When the drain-source voltage of the transistor corresponds to a voltage threshold used by compensation unit 78 for indicating when secondary switching element 40 has actually turned-off (e.g., equals zero volts), comparator 50E may produce an output that indicates the drain $T_{MEASURED}$ associated with switching element 40.

For example, compensation unit 78 may determine that the initial moment when the drain-source voltage of the transistor drops from a value that is greater than zero volts to a value that is less than zero volts, may indicate the start of the TMEASURE period. Compensation unit 78 may determine that the subsequent movement when the drain-source voltage rises from a value that is less than zero volts to a value that is greater than zero volts may indicate the end of the TMEASURE period.

Logic unit 72 may receive the output signal that indicates $T_{MEASURED}$ from comparator 50E. Logic unit 72 may subtract a predefined switching dead time ($T_{DEAD}$) associated with secondary switching element 40 from $T_{MEASURED}$ to obtain a target turn-on time $T_{TARGET}$. Logic unit 72 may subtract the predicted turn-on time $T_{DET}$ from the target turn-on time $T_{TARGET}$ in order to obtain the error in the turn-on time $T_{ERROR}$.

Logic unit 72 will cause switch 54B to close, and conduct current from source 68A for an amount of time that is proportionate to the error in the turn-on time $T_{ERROR}$. When switch 54B is closed, the current from source 68A will charge capacitor 56B.

When primary switching element 25 switches-off and causes the secondary side current QTON signal to change from a logic low to a logic high, logic unit 72 may cause switch 54B to open and switch 54C to close. Closing switch 54C after opening switch 54B causes capacitor 56B to discharge and causes capacitor 56A to have additional time equal to the error in the turn-on time $T_{ERROR}$ to further discharge since logic unit 70 will prevent QTON, as QTON is output from logic unit 70, from changing to a logic level high for an additional amount of time that is approximately equal to $T_{ERROR}$.

Current source 68A, sink 68B, capacitor 56B, and comparator 50F combine to generate one time delay that is received by logic unit 70. Logic unit 70 will delay the change of QTON based on the generated time delay on that inverter 58 detects the change in QTON after the delay. In this way, compensation unit 58 causes the switch-off of secondary switching element 40 to be prolonged or expedited. With subsequent switching cycles, compensation unit 78 may continue to refine the delay to QTON such that, over time, the actual turn-on time associated with secondary switching element 40 more closely matches the predicted turn-on time $T_{DET}$.

SRIC 42A has several advantages over other types of converters. For example, SRIC 42A can be fully implemented using (inexpensive) low-voltage technology without using any very low threshold comparisons. In addition, SRIC 42A can not only be used for discontinuous current mode, but can also be used for continuous current mode.

Figure 6:
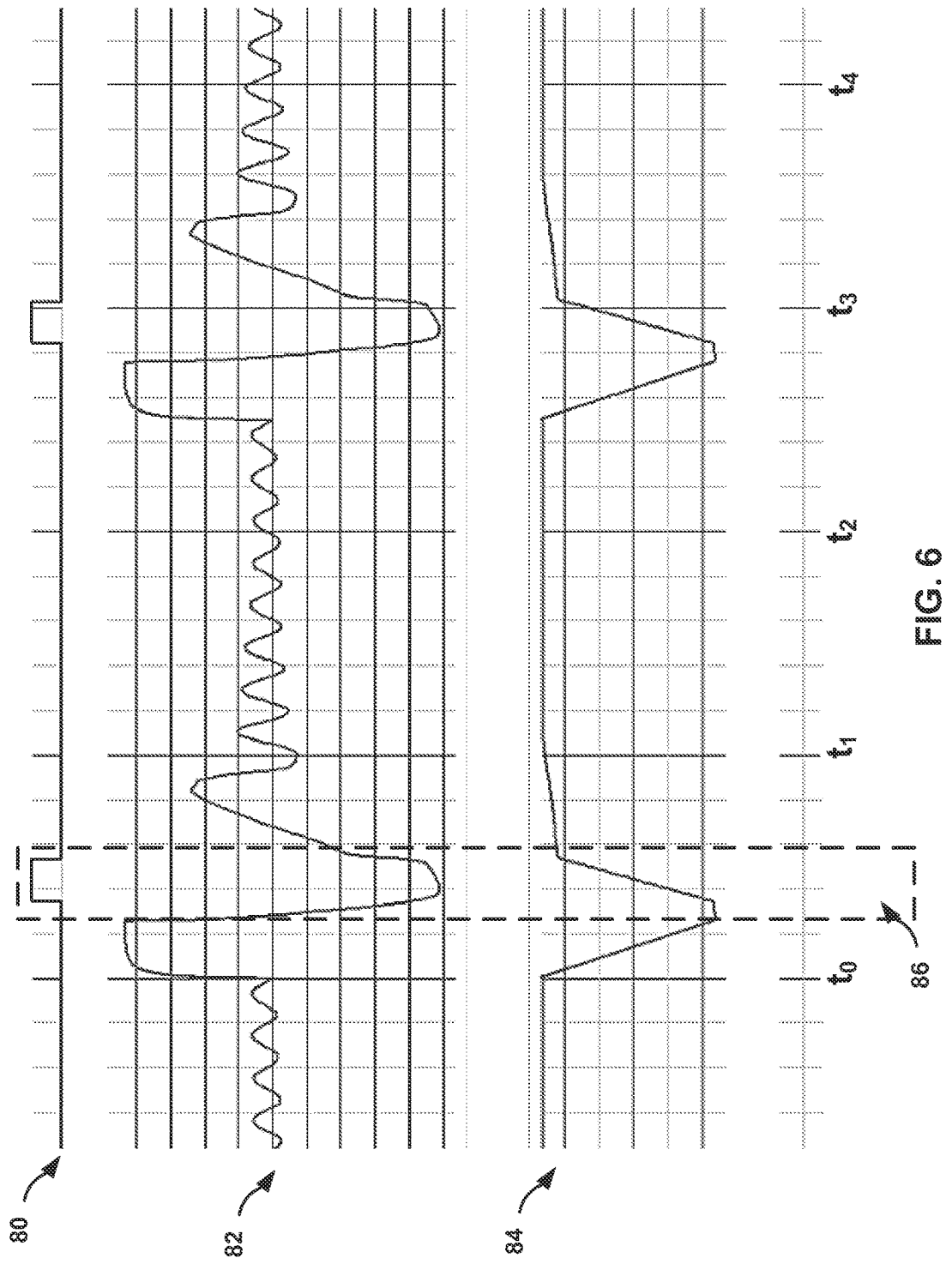
FIG. 6 is a timing diagram illustrating various voltage characteristics of the example synchronous rectification integrated circuit shown in FIG. 5, in accordance with one or more aspects of the present disclosure.

FIG. 6 is a timing diagram illustrating various voltage characteristics of SRIC 42A shown in FIG. 5, in accordance with one or more aspects of the present disclosure. FIG. 6 is described below within the context of converter 6B of FIG. 4 and SRIC 42A of FIG. 5.

FIG. 6 shows plots 80, 82, and 84 which show different voltage levels between times t0 and t4. Plot 80 shows the gate signal generated by SRIC 42A over link 48B between times t0 and t4. Plot 82 shows the voltage detected by SRIC 42A at link 48A (e.g., the voltage across resistor 64B). Plot 84 shows the voltage across capacitor 56A between t0 and t4.

Plots 80-84 illustrate that the voltage at link 48A can be used to predict, determine, or otherwise infer the predicted turn-on time TDET associated with secondary switching element 40. For example, during time period 86 (between t0 and t1) when primary switching element 25 is switched-on $T_{ON}$), the sudden drop in voltage at link 48A causes prediction unit 76 to generate a gate signal via link 48B that causes secondary switching element 40 to switch-on for the amount of time that it takes for prediction unit 76 to charge and then discharge capacitor 56A (e.g., approximately $T_{DET}$).

Plots 80-84 also illustrate the problems associated with a predictive timing control scheme that does not rely on the compensation techniques described herein and performed, for example, by compensation unit 78 of SRIC 42A. For instance, because predictive techniques do not consider parasitic components that may be connected to transformer 22, EQ. 1 may not be satisfied. Second, the use of an external voltage divider, such as divider 44, may negatively effect the turn-on time associated with secondary switching element 40 and cause the actual turn-on time to be different than the predicted $T_{DET}$. Third, during light load conditions, $V_{DET}$ voltage cannot be exactly equal to EQ. 13. Therefore, the calculations for $T_{DET}$ (e.g., EQ. 8) may less accurate than normal load conditions.

$$\left(\frac{V_{in}}{n} + V_{OUT}\right) \qquad \text{EQ. 13}$$

Lastly, resistor divider matching to satisfy EQ. 12 is very important. Some mismatching may occur during implementation of prediction unit 76, and the mismatching of the resistors 64 may cause further inaccuracies in the computation of $T_{DET}$.

Figure 7:
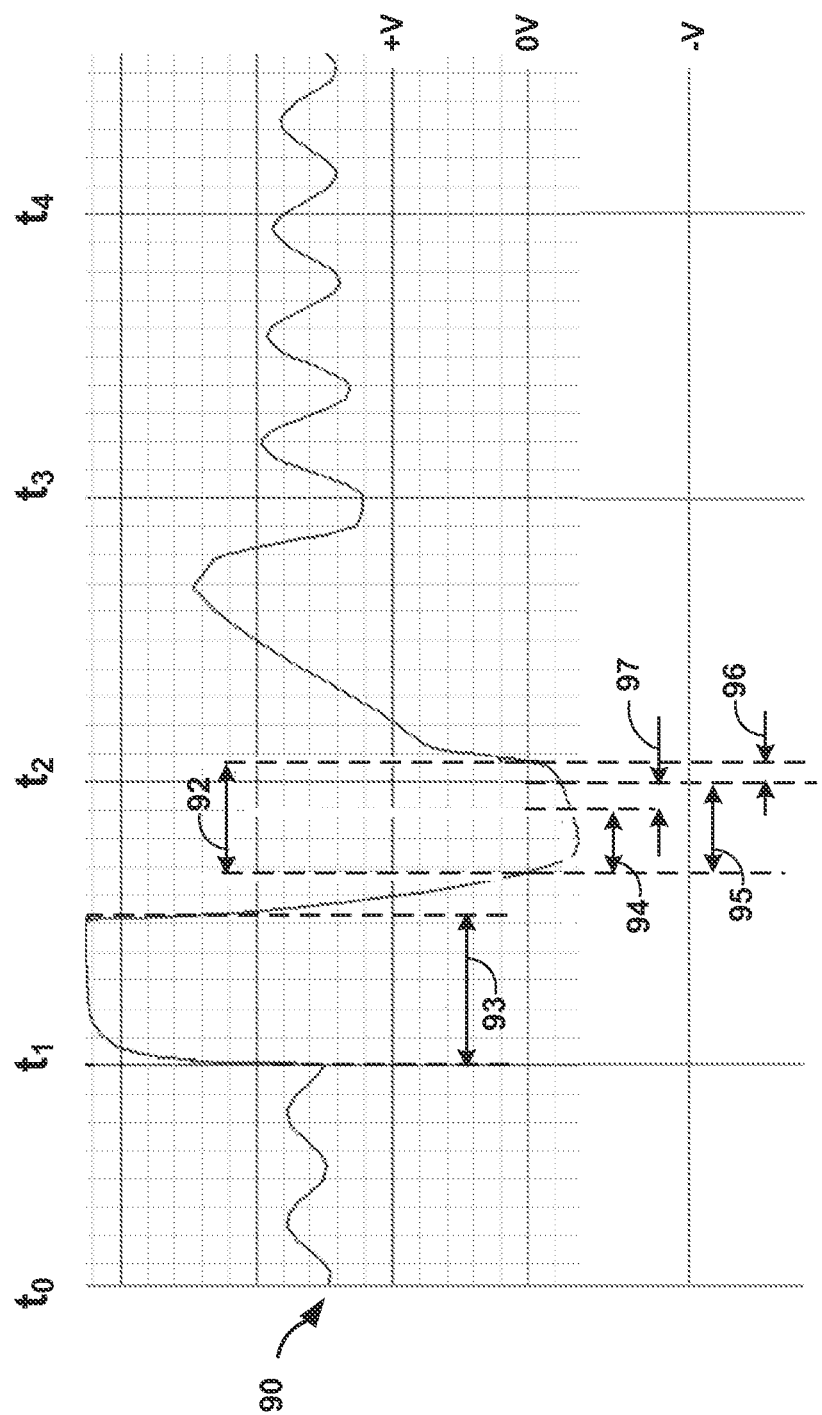
FIG. 7 is a timing diagram illustrating an enhanced view of a secondary-side voltage level input to the example synchronous rectification integrated circuit shown in FIG. 5, in accordance with one or more aspects of the present disclosure.

FIG. 7 is a timing diagram illustrating an enhanced view of a secondary-side voltage level input to SRIC 42A shown in FIG. 5, in accordance with one or more aspects of the present disclosure. FIG. 7 is described below in the context of system 1 of FIG. 1, converter 6B of FIG. 4, and SRIC 42A of FIG. 5.

As described above, the performance of compensation techniques, for example, by compensation unit 78, will improve the accuracy of synchronous rectification techniques being performed using predictive timing control techniques. Plot 90 of FIG. 7 shows the voltage detected by SRIC 42A between times t0 and t4 at link 48A.

Period 93 represents the turn-on time associated with primary switching element 25 ($T_{ON}$). Period 92 (e.g., the time when the voltage at link 48 is less than zero volts) represents the actual or measured turn-on time associated with secondary switching element 40 ($T_{MEASURED}$). Period 94 represents the predicted turn-on time associated with secondary switching element 40 ($T_{DET}$). Period 95 represents the target turn-on time associated with secondary switching element 40 ($T_{TARGET}$). Recall $T_{TARGET}$ is computed by logic unit 72 as $T_{MEASURED}-T_{DEAD}$. The dead time associated with secondary switching element 40 ($T_{DEAD}$) is shown as period 96. Lastly, FIG. 7 shows period 97 as the error time ($T_{ERROR}$) associated with secondary switching element 40. In other words, period 97 represents the amount of time that logic unit 74 and 70 delay or expedite the change in QTON to cause capacitor 56A to faster or slower, in order to improve the accuracy of the switch-off of secondary switching element 40 and improve the accuracy of the synchronous rectification techniques performed by converter 6B. Recall from FIG. 5, $T_{ERROR}$ is determined by subtracting $T_{DEAD}$ and $T_{DET}$ from $T_{MEASURE}$.

By continuously updating $T_{ERROR}$ during subsequent switching cycles, compensation unit 78 allows SRIC 42A to dynamically adjust the turn-on time associated with secondary switching element 40 to compensate for parasitic elements associated with transformer 22, or other anomalies that may cause the turn-on time to be less than or greater than the ideal predicted time $T_{DET}$. In this way, a synchronous rectification integrated circuit, such as SRIC 42A, may perform predictive timing control techniques to perform synchronous rectification, using compensation techniques to adaptively adjust variation between a prediction and actual turn-on time associated with a synchronous rectification switching element, thereby allowing the synchronous rectification integrated circuit to provide a highly accurate and very robust, low cost solution.

Figure 8:
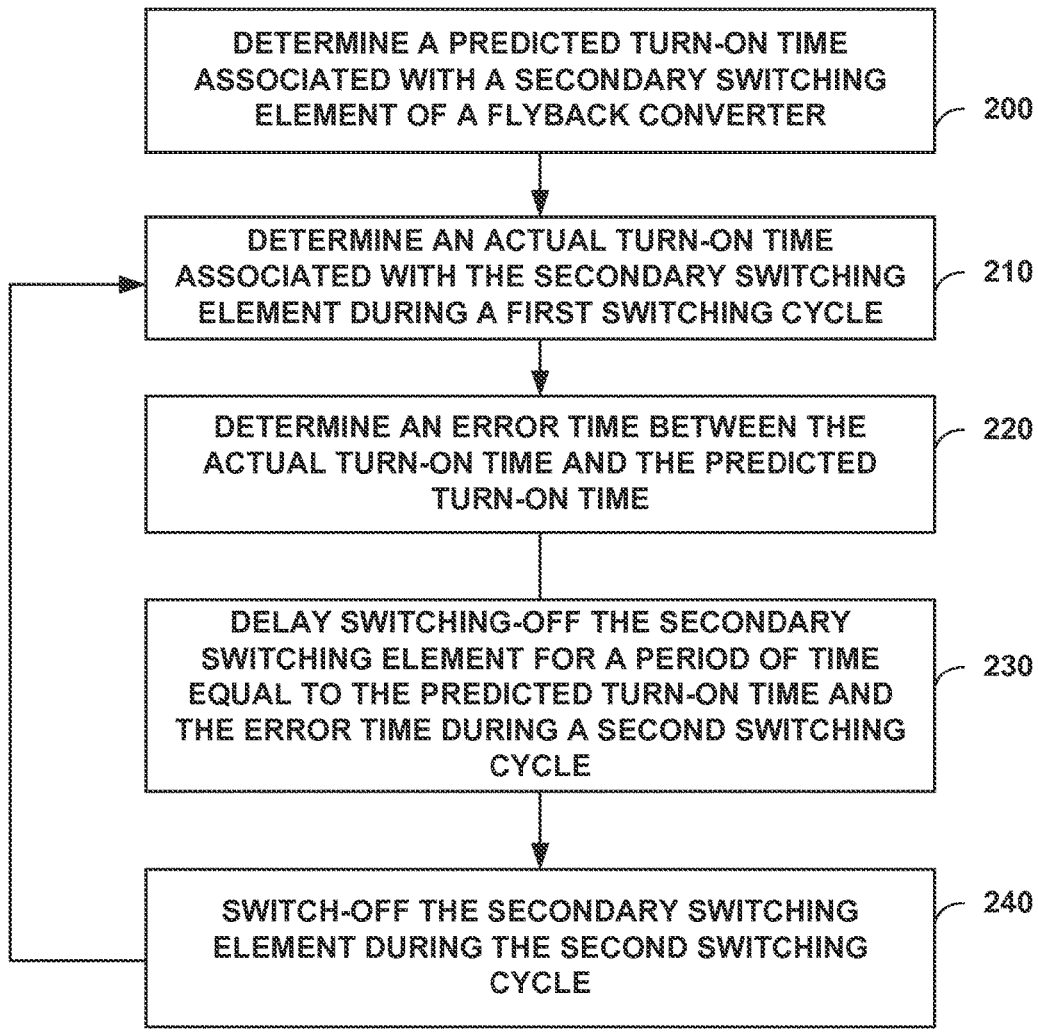
FIG. 8 is a flowchart illustrating example operations of the example synchronous rectification integrated circuit shown in FIG. 5, in accordance with one or more aspects of the present disclosure.

FIG. 8 is a flowchart illustrating example operations of synchronous rectification integrated circuit 42 shown in FIG. 4, in accordance with one or more aspects of the present disclosure. FIG. 8 is described in the context of system 1 of FIG. 1.

SRIC 42 may determine a predicted turn-on time associated with a secondary switching element of a flyback converter (200). For example, SRIC 42 may determine $T_{DET}$ associated with secondary switching element 40 according to EQS. 2-8.

SRIC 42 may determine an actual turn-on time associated with the secondary switching element during a first switching cycle (210). For example, SRIC 42 may monitor the drain-source voltage associated with secondary switching element 40 to determine the amount of time that lapses from when the voltage at link 48A drops below zero volts before the voltage rises above zero volts. SRIC 42 may determine that the period of time when the voltage is less than zero volts is the actual turn-on time $T_{MEASURE}$ associated with secondary switching element 40.

SRIC 42 may determine an error time between the actual turn-on time and the predicted turn-on time (220). For instance, SRIC 42 may compute the difference $T_{ERROR}$ between $T_{MEASURE}$ and the sum of $T_{DEAD}$ associated with secondary switching element 40 and $T_{DET}$. For examples, the difference $T_{ERROR}$ may define approximately the difference between $T_{MEASURE}$ and the sum of $T_{DEAD}$ associated with secondary switching element 40 and $T_{DET}$ (e.g., within a tolerance of one to ten micro seconds, one to ten milliseconds, etc.).

SRIC 42 may delay switching-off the secondary switching element for a period of time equal to the predicted turn-on time and the error time during a second switching cycle (230). For example, after switching-on secondary switching element 40, SRIC 42 may wait until an amount of time equal to a sum between $T_{ERROR}$ and $T_{DET}$ has elapsed before switching-off secondary switching element 40.

SRIC 42 may switch-off the secondary switching element during the second switching cycle (240). For example, after delaying the switch-off of secondary switching element 40, SRIC 42 may cause secondary switching element 40 to switch-off.

SRIC 42 may repeat the steps 210 240 to further improve the accuracy of the synchronous rectification techniques associated with converter 6B. For instance, SRIC 42 may compute a subsequent $T_{ERROR}$ between $T_{DET}$ and $T_{MEASURE}$ during a third, forth, fifth, etc. switching cycle. Over time, the switch-on and switch-off of secondary switching element 40 may more closely match the switch-on and switch-off of primary switching element 25.

Figure 9:
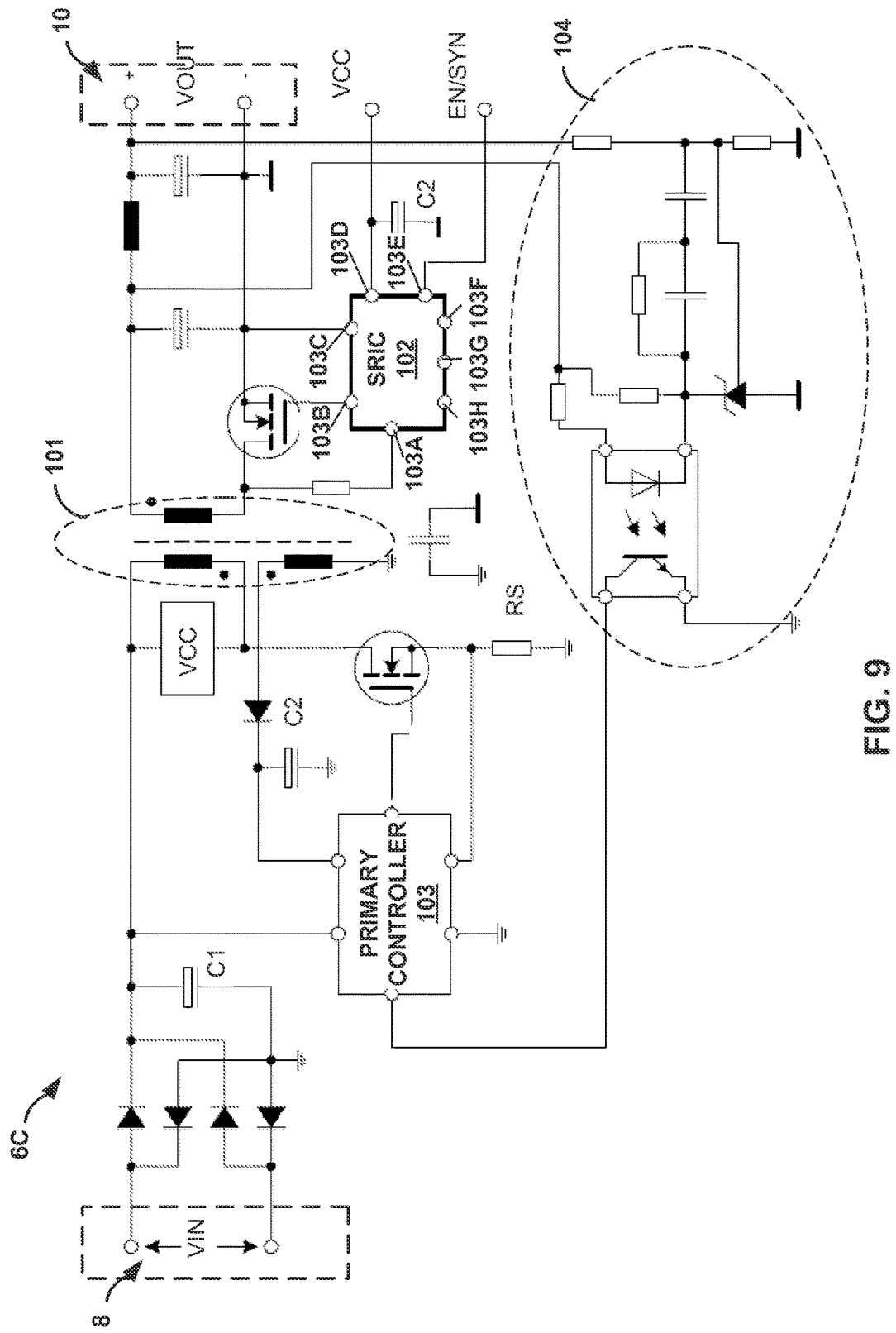
FIGS. 9-11 are circuit diagrams illustrating example power converters of the example system shown in FIG. 1, that are configured to perform synchronous rectification, without the benefit of one or more aspects of the present disclosure.
Figure 10:
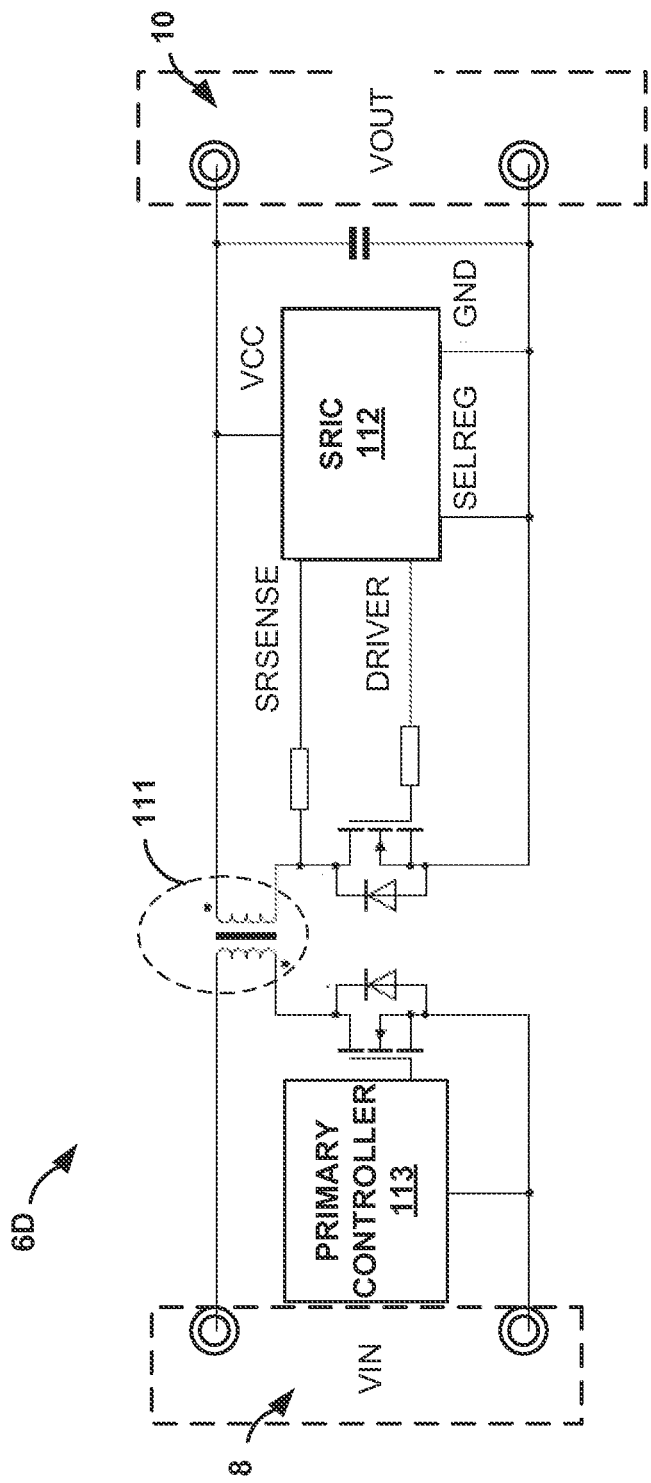
Figure 11:
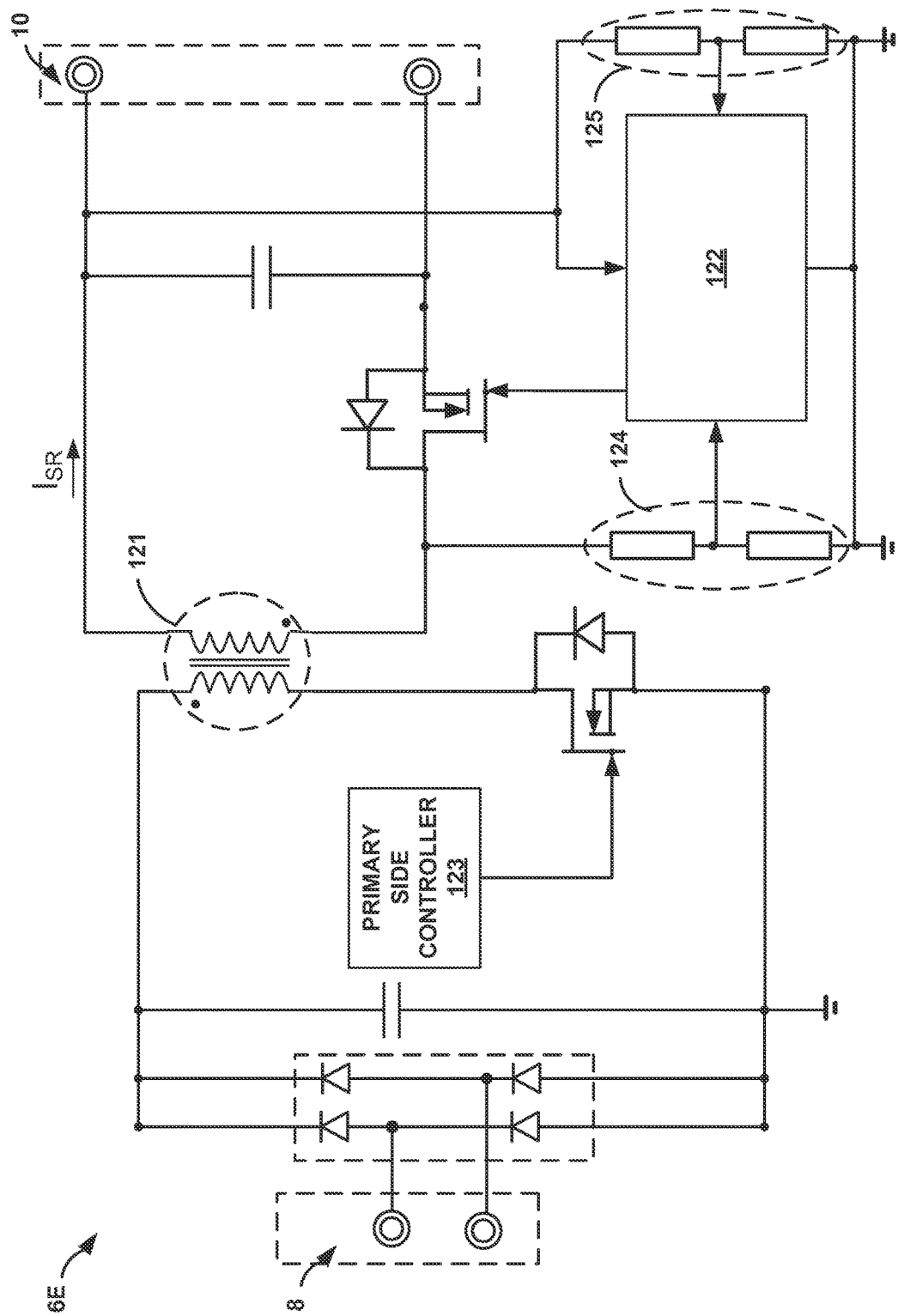

FIGS. 9-11 are circuit diagrams illustrating examples of power converter 6 of system 1 shown in FIG. 1, that are configured to perform synchronous rectification, without the benefit of one or more aspects of the present disclosure. FIGS. 9-11 are each described in the context of system 1 of FIG. 1

FIG. 9 is a circuit diagram of power converter 6C in contrast to power converter 6B of FIG. 4. For example, power converter 6C is coupled to links 8 and 10 and has primary controller 103 for controlling a primary element at the primary-side of transformer 101 to control a voltage level at the secondary-side of transformer 101. However, unlike power converter 6B, power converter 6C relies on SRIC 102 and feedback circuit 104 to perform synchronous rectification of the voltage output at link 10.

Unlike power converter 6B, power converter 6C suffers from multiple drawbacks including increased cost, complexity, and limits on operating capability (e.g., operating frequency and/or magnitude of $V_{IN}$ and/or $V_{OUT}$). For example, pin 103A (e.g., the DSM pin) must have a very high breakdown voltage (e.g., >200V). Therefore, the integrated circuit chip technology used to produce SRIC 102 must be able to withstand such a high voltage and may be expensive to manufacture. In addition, the requirement to withstand a high breakdown voltage may conflict with additional requirements of SRIC 102. In some examples, pin 103A may also be used for voltage sensing of the voltage level at the secondary-side winding of 101 (e.g., to determine when to switch of the secondary switching element at the secondary-side of converter 6C). Accordingly, pin 103A must be capable of detecting very low voltages (e.g., on the magnitude of approximately negative ten millivolts with a tolerance of ten microvolts). This level of accuracy may further increase cost and complexity of manufacturing SRIC 102. In addition, if power converter 6C is a component on a PCB board, SRIC 102 may be susceptible and have to compensate for a large amount of noise.

FIG. 10 is a circuit diagram of power converter 6D in contrast to power converter 6B of FIG. 4. For example, power converter 6D is coupled to links 8 and 10 and has primary controller 113 for controlling a primary element at the primary-side of transformer 111 to control a voltage level at the secondary-side of transformer 111. However, unlike power converter 6B, power converter 6D relies on SRIC 112 to perform synchronous rectification of the voltage output at link 10.

SRIC 112 includes a pin labeled SESENSE that is connected to the secondary-side of transformer 111 through a single resistor, labeled RSRSENSE. SRIC 112 depends on the SRSENSE pin to both withstand high voltages (e.g., >120V) and simultaneously sense very low voltages at the secondary-side winding of transformer 111 and compare the sensed voltage to very low voltage thresholds to determine when to switch on the secondary-side switching element.

SRIC 112 shares similar drawbacks as SRIC 102 of converter 6C, when SRIC is compared to power converter 6B. For example, the SRSENSE pin breakdown voltage should be very high (up to 120V) which typically requires the manufacture of SRIC 112 using high-voltage IC chip technology. Second, since SRSENSE pin is also used for voltage sensing to determine when to switch of the secondary switching element, SRIC 112 must be able to discern, with a very high accuracy and at very low levels, whether the voltage at the secondary winding of transformer 111 is greater than or less than a very low threshold voltage (e.g., approximately negative ten millivolts with a tolerance of ten microvolts).

FIG. 11 is a circuit diagram of power converter 6E in contrast to power converter 6B of FIG. 4. For example, power converter 6E is coupled to links 8 and 10 and has primary controller 123 for controlling a primary element at the primary-side of transformer 121 to control a voltage level at the secondary-side of transformer 121. However, unlike power converter 6B, power converter 6E relies SRIC 122, and external voltage dividers 124 and 125, to perform synchronous rectification of the voltage output at link 10.

Converter 6E utilizes purely linear-predictive timing control techniques to determine when to switch-on and/or switch of the secondary switching element to perform synchronous rectification. Converter 6E does not perform any compensation or error correcting techniques to improve the accuracy of its synchronous rectification techniques overtime. In performing linear-predictive timing control techniques, SRIC 122 detects the voltage of the secondary-side winding of transformer 121 and the output voltage at link 10, rather than detecting current through the secondary switching element in an attempt to enhance "noise immunity" characteristics of SRIC 122. Although converter 6E has some advantages over converters 6C and 6D, converter 6E with SRIC 122 have several disadvantages.

One drawback is that converter 6E can only be used for low frequency applications since, the tolerances of the voltage detection mechanisms used by converter 6E are too large for high frequency applications. In addition, converter 6E can only be used in a relatively narrow operating range since converter 6E may cause the secondary switching element to have a large variation in switch-on time since the switch-on time determined by SRIC 122 depends on the input voltage $V_{IN}$, the output voltage $V_{OUT}$, the switching frequency, etc. Lastly, the accuracy of converter 6E is reduced since converter 6E cannot perform error correction or compensation techniques.

Clause 1. A method comprising: determining, based at least in part on a voltage at a secondary-side winding of a transformer of a flyback converter, a predicted turn-on time associated with a secondary switching element of a flyback converter, the predicted turn-on time defining approximately an amount of time to delay switching-off the secondary switching element after initially switching-on the secondary switching element, during an initial switching cycle of the secondary switching element; determining an actual turn-on time associated with the secondary switching element during the initial switching cycle; determining an error time, wherein the error time defines approximately a difference between the actual turn-on time and the predicted turn-on time during the initial switching cycle; during a subsequent switching cycle of the secondary switching element, and after switching-on the secondary switching element during the subsequent switching cycle, delaying switching-off the secondary switching element for a period of time approximately equal to the predicted turn-on time and the error time during the subsequent switching cycle; and after delaying switching-off the secondary switching element during the subsequent switching cycle, switching-off the secondary switching element during the subsequent switching cycle.

Clause 2. The method of clause 1, wherein the actual turn-on time associated with the secondary switching element is determined based on a determination that a drain-source voltage associated with the secondary switching element has initially dropped below a voltage threshold and subsequently risen above the voltage threshold, during the initial switching cycle.

Clause 3. The method of any of clauses 1-2, wherein determining the error time between the actual turn-on time and the predicted turn-on time comprises determining the difference between the actual turn-on time, a dead time associated with the secondary switching element, and the predicted turn-on time.

Clause 4. The method of any of clauses 1-3, wherein the subsequent switching cycle is a first subsequent switching cycle and the period of time is a first period of time, the method further comprising: determining an actual turn-on time associated with the secondary switching element during the first subsequent switching cycle; determining an error time between the actual turn-on time and the predicted turn-on time during the first subsequent switching cycle; during a second subsequent switching cycle of the secondary switching element, and after switching-on the secondary switching element during the second subsequent switching cycle, delaying switching-off the secondary switching element for a second period of time equal to the predicted turn-on time and the error time during the second subsequent switching cycle; and after delaying switching-off the secondary switching element, switching-off the secondary switching element during the second subsequent switching cycle.

Clause 5. The method of clause 4, wherein the error time during the first subsequent switching cycle is different from the error time during the second subsequent switching cycle.

Clause 6. The method of any of clauses 1-5, wherein switching-off the secondary switching element during the subsequent switching cycle is in response to determining that a capacitor of a synchronous rectification integrated circuit has charged during the period of time equal to the predicted turn-on time and the error time during the subsequent switching cycle.

Clause 7. The method of any of clauses 1-6, wherein delaying switching-off the secondary switching element for the period of time equal to the predicted turn-on time and the error time during the subsequent switching cycle comprises charging a capacitor of a synchronous rectification integrated circuit for an amount of time that is equal to the error time, wherein switching-off the secondary switching element during the subsequent switching cycle is in response to determining that the capacitor has discharged.

Clause 8. The method of any of clauses 1-7, wherein the secondary switching element comprises a power MOSFET.

Clause 9. The method of any of clauses 1-8, further comprising: determining, at an output of a voltage divider, the voltage at the secondary-side winding of the transformer of the flyback converter.

Clause 10. The method of clause 9, wherein the voltage divider is a first voltage divider, the method further comprising: determining, at an output of a second voltage divider, an output voltage of the flyback converter, wherein the predicted turn-on time is determined further based at least in part on the output voltage.

Clause 11. The method of clause 10, wherein the first voltage divider is an external component associated with a synchronous rectification integrated circuit of the flyback converter, and the second voltage divider is an internal component of the synchronous rectification integrated circuit, wherein the synchronous rectification integrated circuit is configured to switch-on the secondary switching element and delay switching-off the secondary switching element during the initial and subsequent switching cycles.

Clause 12. A power circuit comprising: a transformer arranged to store energy between a primary-side of the power circuit and a secondary-side of the power circuit; a primary switching element coupled to a primary-side winding of the transformer; a secondary switching element coupled to a secondary-side winding of the transformer; and a synchronous rectification integrated circuit configured to: determine an actual turn-on time associated with the secondary switching element during an initial switching cycle; determine an error time that defines approximately a difference between the actual turn-on time and a predicated turn-on time associated with the secondary switching element during the initial switching cycle, wherein the predicted turn-on time defines approximately an amount of time to delay switching-off the secondary switching element after initially switching-on the secondary switching element, during an initial switching cycle of the secondary switching element; during a subsequent switching cycle of the secondary switching element, and after switching-on the secondary switching element during the subsequent switching cycle, delay switching-off the secondary switching element for a period of time approximately equal to the predicted turn-on time and the error time during the subsequent switching cycle; and after delaying switching-off the secondary switching element during the subsequent switching cycle, switch-off the secondary switching element during the subsequent switching cycle.

Clause 13. The power circuit of clause 12, wherein the synchronous rectification integrated circuit is further configured to determine, based at least in part on a voltage at the secondary-side winding of the transformer, the predicted turn-on time associated with a secondary switching element during the initial switching cycle.

Clause 14. The power circuit of any of clauses 12-13, wherein the synchronous rectification integrated circuit is further configured to determine the actual turn-on time associated with the secondary switching element based on a determination that a drain-source voltage associated with the secondary switching element has initially dropped below a voltage threshold and subsequently risen above the voltage threshold, during the initial switching cycle.

Clause 15. The power circuit of any of clauses 12-14, wherein the synchronous rectification integrated circuit is further configured to determine the error time between the actual turn-on time and the predicted turn-on time by determining the difference between the actual turn-on time, a dead time associated with the secondary switching element, and the predicted turn-on time.

Clause 16. The power circuit of any of clauses 12-15, wherein the synchronous rectification integrated circuit is further configured to switch-off the secondary switching element during the subsequent switching cycle in response to determining that a capacitor of the synchronous rectification integrated circuit has charged during the period of time equal to the predicted turn-on time and the error time during the subsequent switching cycle.

Clause 17. The power circuit of any of clauses 12-16, wherein the synchronous rectification integrated circuit is further configured to: delay switching-off the secondary switching element for the period of time equal to the predicted turn-on time and the error time during the subsequent switching cycle by at least charging a capacitor of the synchronous rectification integrated circuit tier an amount of time that is equal to the error time; and switch-off the secondary switching element during the subsequent switching cycle in response to determining that the capacitor has discharged.

Clause 18. The power circuit of any of clauses 12-17, further comprising: an output of the power circuit; and an external voltage divider coupled to the secondary-side winding of the transformer, wherein: the synchronous rectification integrated circuit further comprises an internal voltage divider coupled to the output of the power circuit, and the synchronous rectification integrated circuit is further configured to: determine, at an output of the external voltage divider, the voltage at the secondary-side winding of the transformer of the power circuit; and determine, at an output of the internal voltage divider, an output voltage of the power circuit, the synchronous rectification integrated circuit being further configured to determine the predicted turn-on time based at least in part on the output voltage.

Clause 19. The power circuit clause 18, wherein a resistor ratio of a first and second resistor of the external voltage divider is equal to a resistor ratio of a first and second resistor of the internal voltage divider.

Clause 20. A power circuit comprising: means for determining, based at least in part on a voltage at a secondary-side winding of a transformer of a flyback converter, a predicted turn-on time associated with a secondary switching element of a flyback converter, the predicted turn-on time defining approximately an amount of time to delay switching-off the secondary switching element after initially switching-on the secondary switching element, during an initial switching cycle of the secondary switching element; means for determining an actual turn-on time associated with the secondary switching element during the initial switching cycle; means for determining an error time, wherein the error time defines approximately a difference between the actual turn-on time and the predicted turn-on time during the initial switching cycle; means for during a subsequent switching cycle of the secondary switching element, and after switching-on the secondary switching element during the subsequent switching cycle, delaying switching-off the secondary switching element for a period of time approximately equal to the predicted turn-on time and the error time during the subsequent switching cycle; and means for after delaying switching-off the secondary switching element during the subsequent switching cycle, switching-off the secondary switching element during the subsequent switching cycle.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. Many of the described examples concern techniques for communicating between the secondary and primary-side of a flyback converter so as to enable the use of a common controller for both sides of the flyback converter. However, the described techniques for communicating between two sides of a transformer may also be used for other reasons, or in other transformer applications. These and other examples are within the scope of the following claims.

What is claimed is:

1. A method comprising:
determining, based at least in part on a voltage at a secondary-side winding of a transformer of a flyback converter, a predicted turn-on time associated with a secondary switching element of the flyback converter, the predicted turn-on time defining approximately an amount of time to delay switching-off the secondary switching element after initially switching-on the secondary switching element to perform synchronous rectification during an initial switching cycle of the secondary switching element;
determining a first actual turn-on time associated with the secondary switching element to perform synchronous rectification during the initial switching cycle;
determining a first error time, wherein the first error time defines approximately a time difference between the first actual turn-on time and the predicted turn-on time;
during a first subsequent switching cycle of the secondary switching element, and after switching-on the secondary switching element during the first subsequent switching cycle, delaying switching-off the secondary switching element for a first period of time approximately equal to a sum of the predicted turn-on time and the first error time;
after delaying switching-off the secondary switching element during the first subsequent switching cycle for the first period of time, switching-off the secondary switching element to perform synchronous rectification during the first subsequent switching cycle;
determining a second actual turn-on time associated with the secondary switching element during the first subsequent switching cycle;
determining a second error time between the second actual turn-on time and the predicted turn-on time during the first subsequent switching cycle;
during a second subsequent switching cycle of the secondary switching element, and after switching-on the secondary switching element during the second subsequent switching cycle, delaying switching-off the secondary switching element for a second period of time equal to a sum of the predicted turn-on time and the second error time during the second subsequent switching cycle; and
after delaying switching-off the secondary switching element, switching-off the secondary switching element during the second subsequent switching cycle.

2. The method of claim 1, wherein the first actual turn-on time associated with the secondary switching element is determined based on a determination that a drain-source voltage associated with the secondary switching element has initially dropped below a voltage threshold and subsequently risen above the voltage threshold, during the initial switching cycle.

3. The method of claim 1, wherein determining the first error time comprises subtracting a dead time associated with the secondary switching element from the first actual turn-on time prior to determining the first error time.

4. The method of claim 1, wherein the first error time during the first subsequent switching cycle is different from the second error time during the second subsequent switching cycle.

5. The method of claim 1, wherein switching-off the secondary switching element during the first subsequent switching cycle is in response to determining that a capacitor of a synchronous rectification integrated circuit has charged during the first period of time.

6. The method of claim 1,
wherein delaying switching-off the secondary switching element for the first period of time comprises charging a capacitor of a synchronous rectification integrated circuit for an amount of time that is equal to the first error time, and wherein switching-off the secondary switching element during the first subsequent switching cycle is in response to determining that the capacitor has discharged.

7. The method of claim 1, wherein the secondary switching element comprises a power MOSFET.

8. The method of claim 1, further comprising:
determining, at an output of a voltage divider, the voltage at the secondary-side winding of the transformer of the flyback converter.

9. The method of claim 8, wherein the voltage divider is a first voltage divider, the method further comprising:
determining, at an output of a second voltage divider, an output voltage of the flyback converter, wherein the predicted turn-on time is determined further based at least in part on the output voltage.

10. The method of claim 9, wherein the first voltage divider is an external component associated with a synchronous rectification integrated circuit of the flyback converter, and the second voltage divider is an internal component of the synchronous rectification integrated circuit, wherein the synchronous rectification integrated circuit is configured to switch-on the secondary switching element and delay switching-off the secondary switching element during the initial and first subsequent switching cycles.

11. A power circuit comprising:
a transformer arranged to store energy between a primary-side of the power circuit and a secondary-side of the power circuit;
a primary switching element coupled to a primary-side winding of the transformer;
a secondary switching element coupled to a secondary-side winding of the transformer and configured to perform synchronous rectification; and
a synchronous rectification integrated circuit configured to:
determine a first actual turn-on time associated with the secondary switching element to perform synchronous rectification during an initial switching cycle;
determine a first error time that defines approximately a time difference between the first actual turn-on time and a predicted turn-on time associated with the secondary switching element during the initial switching cycle, wherein the predicted turn-on time defines approximately an amount of time to delay switching-off the secondary switching element after initially switching-on the secondary switching element to perform synchronous rectification during an initial switching cycle of the secondary switching element;
during a first subsequent switching cycle of the secondary switching element, and after switching-on the secondary switching element during the first subsequent switching cycle, delay switching-off the secondary switching element for a first period of time approximately equal to a sum of the predicted turn-on time and the first error time;
after delaying switching-off the secondary switching element during the first subsequent switching cycle for the first period of time, switch-off the secondary switching element to perform synchronous rectification during the first subsequent switching cycle;
determine a second actual turn-on time associated with the secondary switching element during the first subsequent switching cycle;
determine a second error time between the second actual turn-on time and the predicted turn-on time during the first subsequent switching cycle;
during a second subsequent switching cycle of the secondary switching element, and after switching-on the secondary switching element during the second subsequent switching cycle, delay switching-off the secondary switching element for a second period of time equal to a sum of the predicted turn-on time and the second error time during the second subsequent switching cycle; and
after delaying switching-off the secondary switching element, switch-off the secondary switching element during the second subsequent switching cycle.

12. The power circuit of claim 11, wherein the synchronous rectification integrated circuit is further configured to determine, based at least in part on a voltage at the secondary-side winding of the transformer, the predicted turn-on time associated with the secondary switching element during the initial switching cycle.

13. The power circuit of claim 11, wherein the synchronous rectification integrated circuit is further configured to determine the first actual turn-on time associated with the secondary switching element based on a determination that a drain-source voltage associated with the secondary switching element has initially dropped below a voltage threshold and subsequently risen above the voltage threshold, during the initial switching cycle.

14. The power circuit of claim 11, wherein the synchronous rectification integrated circuit is further configured to determine the first error time by subtracting a dead time associated with the secondary switching element from the first actual turn-on time prior to determining the first error time.

15. The power circuit of claim 11, wherein the synchronous rectification integrated circuit is further configured to switch-off the secondary switching element during the first subsequent switching cycle in response to determining that a capacitor of the synchronous rectification integrated circuit has charged during the first period of time.

16. The power circuit of claim 11, wherein the synchronous rectification integrated circuit is further configured to:
delay switching-off the secondary switching element for the first period of time by at least charging a capacitor of the synchronous rectification integrated circuit for an amount of time that is equal to the first error time; and
switch-off the secondary switching element during the first subsequent switching cycle in response to determining that the capacitor has discharged.

17. The power circuit of claim 11, further comprising:
an output of the power circuit; and
an external voltage divider coupled to the secondary-side winding of the transformer, wherein:
the synchronous rectification integrated circuit further comprises an internal voltage divider coupled to the output of the power circuit, and
the synchronous rectification integrated circuit is further configured to:
determine, at an output of the external voltage divider, the voltage at the secondary-side winding of the transformer of the power circuit; and
determine, at an output of the internal voltage divider, an output voltage of the power circuit, the synchronous rectification integrated circuit being further configured to determine the predicted turn-on time based at least in part on the output voltage.

18. The power circuit of claim 17, wherein a resistor ratio of a first and second resistor of the external voltage divider is equal to a resistor ratio of a first and second resistor of the internal voltage divider.

19. A power circuit comprising:

means for determining, based at least in part on a voltage at a secondary-side winding of a transformer of a flyback converter, a predicted turn-on time associated with a secondary switching element of a flyback converter, the predicted turn-on time defining approximately an amount of time to delay switching-off the secondary switching element after initially switching-on the secondary switching element to perform synchronous rectification during an initial switching cycle of the secondary switching element;

means for determining first actual turn-on time associated with the secondary switching element to perform synchronous rectification during the initial switching cycle;

means for determining first error time, wherein the error time defines approximately a time difference between the first actual turn-on time and the predicted turn-on time;

means for during a first subsequent switching cycle of the secondary switching element, and after switching-on the secondary switching element during the first subsequent switching cycle, delaying switching-off the secondary switching element for a first period of time approximately equal to a sum of the predicted turn-on time and the first error time;

means for after delaying switching-off the secondary switching element during the first subsequent switching cycle for the first period of time, switching-off the secondary switching element to perform synchronous rectification during the first subsequent switching cycle;

means for determining a second actual turn-on time associated with the secondary switching element during the first subsequent switching cycle;

means for determining a second error time between the second actual turn-on time and the predicted turn-on time during the first subsequent switching cycle;

means for during a second subsequent switching cycle of the secondary switching element, and after switching-on the secondary switching element during the second subsequent switching cycle, delaying switching-off the secondary switching element for a second period of time equal to a sum of the predicted turn-on time and the second error time during the second subsequent switching cycle; and means for after delaying switching-off the secondary switching element, switching-off the secondary switching element during the second subsequent switching cycle.

* * * * *